(12) United States Patent
Yamasaki

(10) Patent No.: US 11,658,600 B2
(45) Date of Patent: May 23, 2023

(54) MOTOR CONTROLLER, MOTOR SYSTEM AND METHOD FOR CONTROLLING MOTOR

(71) Applicant: MINEBEA MITSUMI Inc., Nagano (JP)

(72) Inventor: Reiji Yamasaki, Kanagawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 86 days.

(21) Appl. No.: 17/593,629

(22) PCT Filed: Mar. 23, 2020

(86) PCT No.: PCT/JP2020/012694
§ 371 (c)(1),
(2) Date: Sep. 22, 2021

(87) PCT Pub. No.: WO2020/196397
PCT Pub. Date: Oct. 1, 2020

(65) Prior Publication Data
US 2022/0166362 A1 May 26, 2022

(30) Foreign Application Priority Data

Mar. 25, 2019 (JP) ............................. JP2019-057288

(51) Int. Cl.
*G05B 11/28* (2006.01)
*H02P 27/08* (2006.01)
(Continued)

(52) U.S. Cl.
CPC ................ *H02P 27/08* (2013.01); *H02P 6/28* (2016.02); *H02P 21/22* (2016.02)

(58) Field of Classification Search
CPC ............. H02P 27/08; H02P 6/28; H02P 21/22
(Continued)

(56) References Cited

U.S. PATENT DOCUMENTS 9,203,330 B2    12/2015  Suzuki
10,001,343 B2 *  6/2018  Zeisler ................... H05B 45/44
(Continued)

FOREIGN PATENT DOCUMENTS

JP    2003-164192    6/2003
JP    2010-279141    12/2010
(Continued)

OTHER PUBLICATIONS

International Search Report for PCT/JP2020/012694 dated Jun. 16, 2020.

*Primary Examiner* — Erick D Glass
(74) *Attorney, Agent, or Firm* — IPUSA, PLLC

(57) ABSTRACT

A motor controller 100-1 includes an inverter 23, a current detection unit 24, and a current detector 27. The motor controller includes a duty-cycle setting unit 31 that sets a duty cycle of each of a first PWM signal, a second PWM signal, and a third PWM signal, based on a corresponding detected value for a given phase. The motor controller includes a PWM signal generator 32. The PWM signal generator 32 adjusts, upon occurrence of a condition in which a given setting value changes, a time sequence order of timings at which the first PWM signal, the second PWM signal, and the third PWM signal respectively change after a change in the given setting value, to be the same as a time sequence order of timings at which the first PWM signal, the second PWM signal, and the third PWM signal respectively change prior to the change in the given setting value, so that a first energization time period and a second energization time period are ensured within half of one period of the carrier. The first energization time period has an energization width in which the current detector enables detecting of a given phase current for any one of phases. The second energization time period has an energization width in which
(Continued)

the current detector enables detecting of a given phase current for any one of the phases.

7 Claims, 14 Drawing Sheets

(51) Int. Cl.
*H02P 6/28* (2016.01)
*H02P 21/22* (2016.01)

(58) Field of Classification Search
USPC .......................................................... 318/599
See application file for complete search history.

(56) References Cited

U.S. PATENT DOCUMENTS

| | | |
|---|---|---|
| 2014/0239861 A1 | 8/2014 | Ajima et al. |
| 2018/0201298 A1* | 7/2018 | Yamano ................. B62D 5/006 |
| 2022/0140766 A1* | 5/2022 | Shouji ................. H02M 7/5395 |
| | | 318/504 |

FOREIGN PATENT DOCUMENTS

| | | |
|---|---|---|
| JP | 2014-168332 | 9/2014 |
| JP | 2015-061421 | 3/2015 |
| JP | 2015-084632 | 4/2015 |

* cited by examiner

MOTOR CONTROLLER, MOTOR SYSTEM AND METHOD FOR CONTROLLING MOTOR

TECHNICAL FIELD

The present invention relates to a motor controller, a motor system, and a method for controlling a motor.

BACKGROUND

Patent Document 1 discloses a technique in which a shunt resistor inserted in a direct current unit in an inverter circuit is used to detect respective currents for U, V, and W phases, in order to control a motor. In such a system, in order to detect the currents for all of three phases, a three-phase PWM signal pattern needs to be generated such that currents for two or more phases can be detected within one period of a pulse width modulation (PWM) carrier.

CITATION LIST

[Patent Document]
[Patent Document 1] Japanese Unexamined Patent Application Publication No. 2015-84632

SUMMARY

However, in conventional techniques, if a phase of a PWM signal changes, distortion of the current flowing into a direct current bus occurs, thereby resulting in a current waveform on which large noise is superimposed. The distortion of the current causes unwanted sound and thus the problem in causing discomfort for a user might occur depending on applications to be coupled to the motor.

In view of the point described above, an object of the present invention is to provide a motor controller that can reduce unwanted sound.

A motor controller according to an embodiment of the present invention includes an inverter configured to drive a motor based on a first PWM signal, a second PWM signal, and a third PWM signal. The motor controller includes a current detection unit configured to output a detection signal corresponding to a magnitude of a current flowing into a direct current line of the inverter. The motor controller includes a current detector configured to detect a phase current for each phase, by obtaining the detection signal. The motor controller includes a duty-cycle setting unit configured to set a duty cycle of each of the first PWM signal, the second PWM signal, and the third PWM signal, based on a corresponding detected value for a given phase. The motor controller includes a PWM signal generator configured to generate each of the first PWM signal, the second PWM signal, and the third PWM signal, by comparing a setting value of a corresponding duty cycle against a level of a carrier, the level of the carrier increasing or decreasing periodically. The PWM signal generator is configured to adjust, upon occurrence of a condition in which a given setting value changes, a time sequence order of timings at which the first PWM signal, the second PWM signal, and the third PWM signal respectively change after a change in the setting value, to be the same as a time sequence order of timings at which the first PWM signal, the second PWM signal, and the third PWM signal respectively change prior to the change in the given setting value, so that a first energization time period and a second energization time period are ensured within half of one period of the carrier.

The first energization time period has an energization width in which the current detector enables detecting of a given phase current for any one of phases. The second energization time period has an energization width in which the current detector enables detecting of a given phase current for any one of the phases.

Effects of the Invention

According to a motor controller according to the present invention, the effect of reducing unwanted sound can be obtained.

BRIEF DESCRIPTION OF DRAWINGS

FIG. 2 is a diagram illustrating an example of the configuration of a carrier generator 37, a PWM signal generator 32, and the like;

DESCRIPTION OF EMBODIMENTS

A motor controller, a motor system, and a method for controlling a motor according to one or more embodiments of the present invention are described below with reference to the drawings.

First Embodiment

Figure 1:
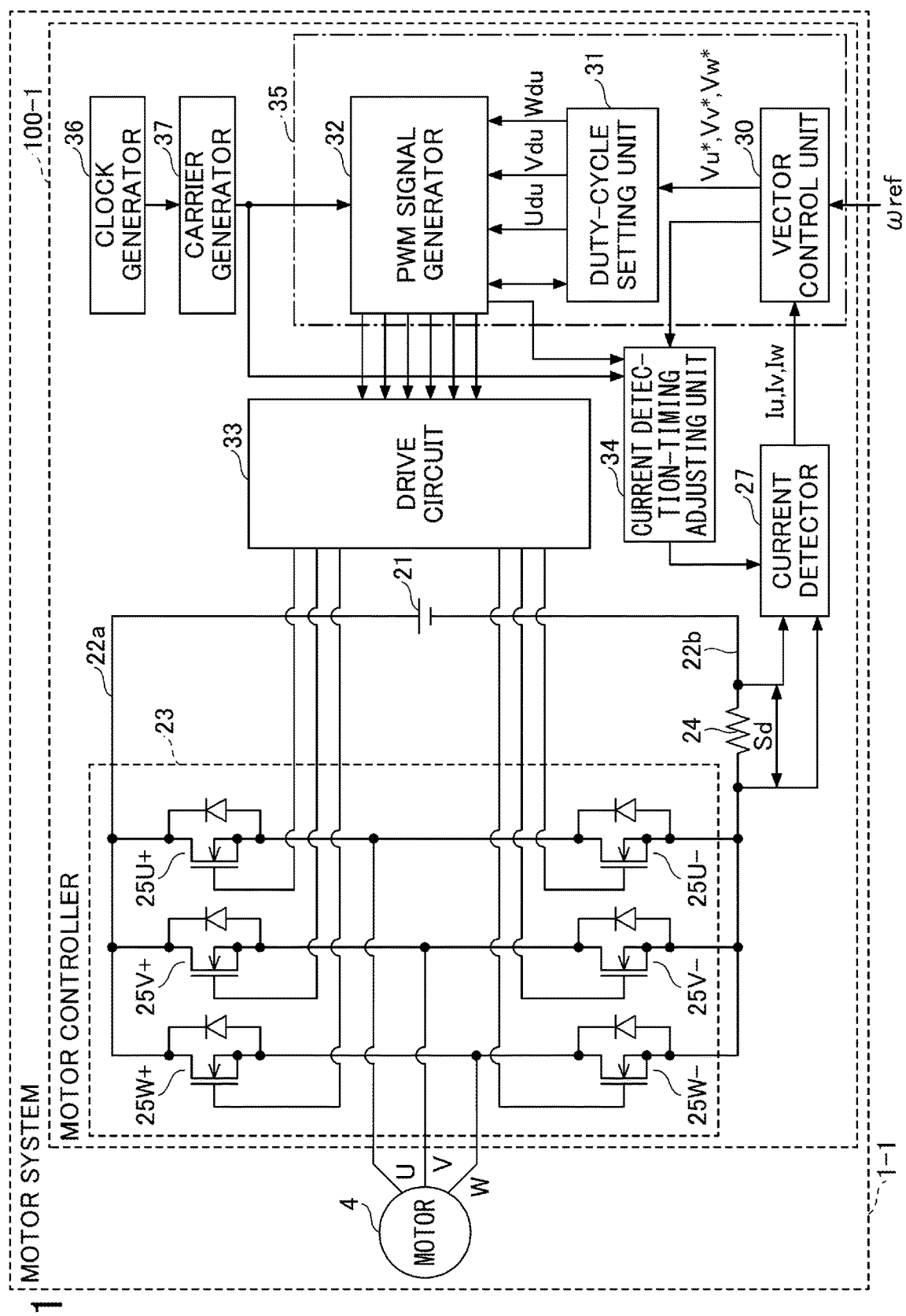
FIG. 1 is a diagram illustrating an example of the configuration of a motor system 1-1 according to a first embodiment of the present invention.
Figure 2:
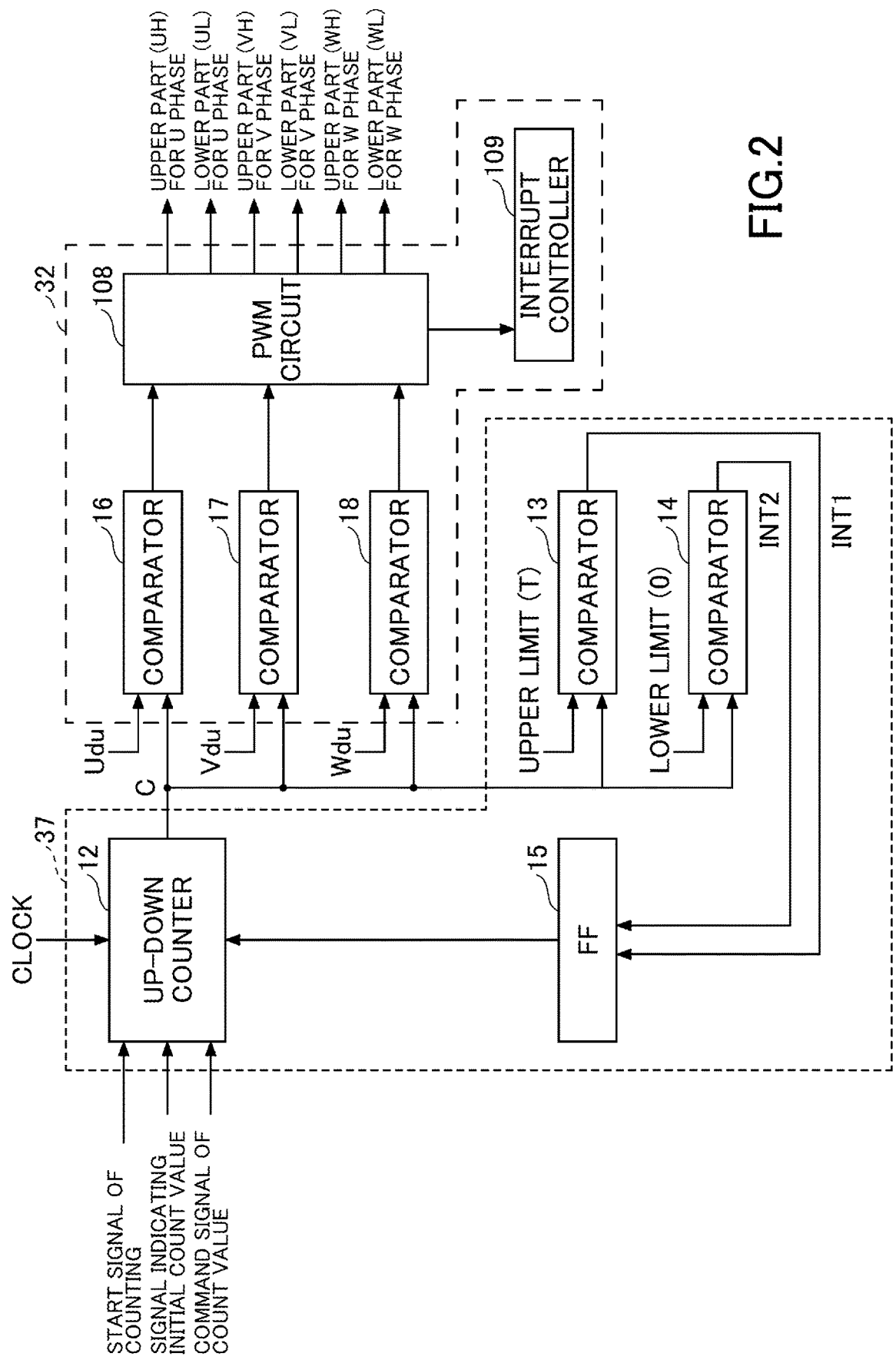

FIG. 1 is a diagram illustrating an example of the configuration of a motor system 1-1 according to a first embodiment of the present invention. FIG. 2 is a diagram illustrating an example of the configuration of a carrier generator 37, a PWM signal generator 32, and the like illustrated in FIG. 1. The motor system 1-1 illustrated in FIG. 1 controls a rotary motion of a motor 4. A device in which the motor system 1-1 is provided includes, for example, a copier, a personal computer, a refrigerator, or the like, but is not limited thereto. The motor system 1-1 includes at least the motor 4 and a motor controller 100-1.

The motor 4 includes multiple coils. For example, the motor 4 includes three-phase coils that include a U-phase coil, a V-phase coil, and a W-phase coil. A specific example of the motor 4 includes a brushless motor, or the like.

Based on an energization pattern that includes PWM signals for three phases, the motor controller 100-1 performs on-off control for the multiple switching elements that are coupled to constitute a three-phase bridge, and thus drives the motor through an inverter that converts a direct current into a three-phase alternating current. The motor controller 100-1 includes an inverter 23, a current detector 27, and a current detection-timing adjusting unit 34. The motor controller 100-1 includes a drive circuit 33, an energization pattern generator 35, a carrier generator 37, and a clock generator 36.

The inverter 23 that is an inverting unit is a circuit that converts the direct current delivered from a DC power source 21 into the three-phase alternating current, by switching of the switching elements, and then rotates a rotor of the motor 4 in response to a three-phase drive alternating current flowing into the motor 4. The inverter 23 drives the motor 4 based on multiple energization patterns (more specifically, PWM signals for three phases generated by the PWM signal generator 32 in the energization pattern generator 35) that the energization pattern generator 35 generates.

The inverter 23 includes multiple switching elements 25U+, 25V+, 25W+, 25U−, 25V−, and 25W− that are coupled to constitute a three-phase bridge. The switching elements 25U+, 25V+, and 25W+ are high-side switching elements (upper arms) that are coupled to a positive electrode of the DC power source 21, via a positive-side bus 22a. The switching elements 25U−, 25V−, and 25W− are low-side switching elements (lower arms) that are coupled to a negative electrode (specifically, a ground) of the DC power source 21. The multiple switching elements 25U+, 25V+, 25W+, 25U−, 25V−, and 25W− are each turned on or off in accordance with a corresponding drive signal, among multiple drive signals that the drive circuit 33 provides based on respective PWM signals included in the energization pattern. In the following description, the switching elements 25U+, 25V+, 25W+, 25U−, 25V−, and 25W− may be also simply referred to as switching elements, when they are not particularly distinguished from one another.

A connection point of the switching element 25U+ and the switching element 25U− is coupled to one end of the U-phase coil of the motor 4. A connection point of the switching element 25V+ and the switching element 25V− is coupled to one end of the V-phase coil of the motor 4. A connection point of the switching element 25W+ and the switching element 25W− is coupled to one end of the W-phase coil of the motor 4. The respective other ends of the U-phase coil, the V-phase coil, and the W-phase coil are coupled to one another.

A specific example of each switching element includes an N-channel metal oxide semiconductor field effect transistor (MOSFET), an insulated gate bipolar transistor (IGBT), or the like. However, the switching element is not limited to the examples described above.

The current detection unit 24 outputs a detection signal Sd corresponding to the magnitude of the current that flows into the DC side of the inverter 23. The current detection unit 24 illustrated in FIG. 1 generates the detection signal Sd corresponding to the magnitude of the current flowing into a negative-side bus 22b. The current detection unit 24 is, for example, a current detection element disposed in the negative-side bus 22b. More specifically, the current detection unit 24 is a shunt resistor inserted in the negative-side bus 22b. The current detection element such as a shunt resistor generates, as a detection signal Sd, a voltage signal corresponding to the magnitude of the current through the current detection element. Note that as long as the current detection unit 24 outputs the detection signal corresponding to the magnitude of the current flowing into the negative-side bus 22b, it is sufficient. The current detection unit 24 may be a sensor such as a current transformer (CT).

The current detector 27 obtains the detection signal Sd based on the multiple energization patterns (more specifically, PWM signals for three phases) that the energization pattern generator 35 generates, to thereby detect phase currents Iu, Iv, and Iw for the respective phases U, V, and W flowing through the motor 4. More specifically, by obtaining the detection signal Sd at an acquisition timing that is synchronized with the multiple energization patterns (more specifically, PWM signals for three phases), the current detector 27 detects the phase currents Iu, Iv, and Iw for the U, V, and W phases to flow into the motor 4. The acquisition timing of the detection signal Sd is set by a current detection-timing adjusting unit 34.

For example, in the current detector 27, an analog-to-digital (AD) converter receives the detection signal Sd indicating an analog voltage occurring across the current detection unit 24, at the acquisition timing that is set by the current detection-timing adjusting unit 34. The AD converter is provided in the current detector 27. The current detector 27 performs AD conversion in which the received analog detection signal Sd is converted into a digital detection signal Sd. By digitally processing the digital detection signal Sd after AD conversion, the current detector 27 detects the phase currents for the U, V, and W phases to flow into the motor 4. Detected values indicating the phase currents Iu, Iv, and Iw of the phases, which are detected by the current detector 27, are provided to the energization pattern generator 35. A clock generator 36 generates a clock at a predetermined frequency, by using a built-in oscillation circuit, and outputs the generated clock to the carrier generator 37. Note that for example, the clock generator 36 operates immediately when the motor controller 100-1 is powered on.

The energization pattern generator 35 includes a duty-cycle setting unit 31 and a PWM signal generator 32. The energization pattern generator 35 generates a pattern (energization pattern of the inverter 23) in which the inverter 23 is to be energized, based on the detected values indicating the phase currents Iu, Iv, and Iw that flow into the motor 4 and that are detected by the current detector 27. The energization pattern of the inverter 23 is used interchangeably with a pattern (energization pattern of the motor 4) in which the motor 4 is to be energized. For example, the energization pattern of the inverter 23 includes PWM signals for three phases that enable the inverter 23 to be energized such that the motor 4 rotates.

Also, when the energization pattern generator 35 generates the energization pattern of the inverter 23 in vector control, the energization pattern generator 35 may include a vector control unit 30, in addition to the duty-cycle setting unit 31 and the PWM signal generator 32. Note that in the present embodiment, the energization pattern of the inverter is generated in the vector control, but is not limited thereto. A given phase voltage for each phase may be determined using of control or the like.

In response to externally receiving a rotation speed command wref for the motor 4, the vector control unit 30 generates a torque current command Iqref and an exciting current command Idre, based on a difference between either a measured value or estimated value for a rotation speed of the motor 4 and the rotation speed command wref. By vector control calculation using a rotor position θ, the vector control unit 30 calculates a torque current Iq and exciting current Id, based on the phase currents Iu, Iv, and Iw for the phases U, V, and W through the motor 4. For example, the vector control unit 30 performs a calculation in PI control, with respect to a difference between the torque current command Iqref and the torque current Iq, and then generates a voltage command Vq. For example, the vector control unit 30 performs a calculation in PI control, with respect to a difference between the exciting current command Idref and the exciting current Id, and then generates a voltage command Vd. The vector control unit 30 converters the voltage commands Vq and Vd into phase voltage commands Vu*, Vv*, and Vw* for the phases U, V, and W, by using the rotor position θ. The phase voltage commands Vu*, Vv*, and Vw* for the respective phases are provided to the duty-cycle setting unit 31.

Based on the respective received phase voltage commands Vu*, Vv*, and Vw* for the phases U, V, and W, the duty-cycle setting unit 31 sets duty cycles (setting values indicating duty cycles for respective phases) Udu, Vdu, and Wdu for generating PWM signals for three phases.

Specific examples of setting the duty cycles Udu, Vdu, and Wdu for respective phases will be described below. The duty cycles Udu, Vdu, and Wdu are set based on modulation factors modU, modV, and modW, as expressed by Equations (1) to (3) below. The duty cycles Udu, Vdu, and Wdu obtained based on Equations (1) to (3) below are each set as a sinusoidal waveform of which the phase is at an offset from other phases, by, e.g., 120 degrees. Note that an example of waveforms of the duty cycles Udu, Vdu, and Wdu for respective phases will be described below.

$$Udu = \text{mod } U \times (\text{upper limit for carrier}) \quad (1)$$

$$Vdu = \text{mod } V \times (\text{upper limit for carrier}) \quad (2)$$

$$Wdu = \text{mod } W \times (\text{upper limit for carrier}) \quad (3)$$

The PWM signal generator 32 generates an energization pattern that includes a PWM signal for a given phase among three phases, by comparing each of the duty cycles Udu, Vdu, and Wdu for respective phases, which is set by the duty-cycle setting unit 31, against a level of the carrier C. The carrier C is a carrier signal of which the level is increased or decreased periodically. The PWM signal generator 32 compares a setting value of the duty cycle for each phase, against the level of the carrier C. In a period during which the setting value of the duty cycle of a given PWM signal is greater than the level of the carrier C, the PWM signal generator 32 sets a level of the given PWM signal to a high level, based on a compared result. In contrast, in a period during which the setting value of the duty cycle of a given PWM signal is less than the level of the carrier C, the PWM signal generator 32 sets the level of the given PWM signal to a low level, based on the compared result. The PWM signal generator 32 also generates PWM signals for three phases for driving the lower arms, by inverting PWM signals for three phases for the upper arms, and then adds dead time to each of one or more PWM signals, as necessary, to thereby output energization patterns that include the generated PWM signals to the drive circuit 33.

In accordance with the given energization patterns including the respective PWM signals, the drive circuit 33 outputs drive signals for switching of six switching elements 25U+, 25V+, 25W+, 25U−, 25V−, and 25W−. In such a manner, a three-phase alternating drive current is provided to the motor 4, and thus the motor 4 rotates.

Based on the carrier C delivered from the PWM signal generator 32 and a given PWM signal generated by the PWM signal generator 32, the current detection-timing adjusting unit 34 determines an acquirement timing at which the current detector 27 detects currents for two phases (the number of phases is two), among three phases.

Note that functions of the current detector 27, the energization pattern generator 35, and the current detection-timing adjusting unit 34 are implemented by a program to cause a central processing unit (CPU) to be executed, where the program is readably stored in a storage device not illustrated. For example, the functions described above are implemented by hardware that communicates with software in a microcomputer that has a CPU.

Hereafter, the carrier generator 37 and the PWM signal generator 32 will be described in detail with reference to FIG. 2.

The carrier generator 37 includes an up-down counter 12, a comparator 13, a comparator 14, and a flip flop 15.

The up-down counter 12 receives a clock, which is output from the clock generator 36 illustrated in FIG. 1, a start signal of counting, and a signal indicating an initial count value.

In response to receiving the start signal of counting, the up-down counter 12 counts the number of clocks, and outputs the carrier C that is a triangular wave carrier, based on an increment (increment of one every time the clock is received), or a decrement (decrement of one every time the clock is received).

In the up-down counter 12, an initial count value is set, and the initial value is set based on the above signal indicating the initial count value.

The comparator 13 compares a count value at the up-down counter 12 against a predetermined upper limit, and detects that the count value reaches the upper limit to thereby output a detection signal INT1.

The comparator 14 compares a count value at the up-down counter 12 against a predetermined lower limit, and detects that the count value reaches the lower limit to thereby output a detection signal INT2.

The flip flop 15 outputs an "L" signal at a low level to the up-down counter 12, in accordance with the output from the comparator 13. The flip flop 15 outputs an "H" signal at a high level to the up-down counter 12, in accordance with the output from the comparator 14.

In response to receiving the "H" signal from the flip flop 15, the up-down counter 12 counts up a count value for the clock in total. In response to receiving the "L" signal from the flip flop 15, the up-down counter 12 counts down a count value for the clock in total. In such a manner, the "H" signal is an increment command to increment a total number. The "L" signal is a decrement command to decrement a total number.

The flip flop 15 receives a command signal of an initial value. Whether an initial state of the flip flop 15 is "H" or "L" is determined based on the command signal of the initial value.

The output of the comparator 13 to perform detection, i.e., a signal indicating that a given count value reaches the upper limit, is provided to the flip flop 15, as described above, while such a signal is output as the detection signal INT1.

Further, the output of the comparator 14 to perform detection, i.e., a signal indicating that a given count value reaches the lower limit, is provided to the flip flop 15, as described above, while such a signal is output as the detection signal INT2.

The PWM signal generator 32 includes three comparators 16, 17, and 18, a PWM circuit 108, and an interrupt controller 109.

The comparator 16 compares the duty cycle Udu for the U phase against the carrier C, and then outputs a compared result by using a pulse. Specifically, the comparator 16 compares a value for the duty cycle Udu against the amplitude of the carrier C. The comparator 16 outputs an "H" signal during a period in which the amplitude of the carrier C is greater than or equal to that of the duty cycle Udu. In contrast, the comparator 16 outputs a "L" signal during a period in which the amplitude of the carrier C is less than that of the duty cycle Udu.

The comparator 17 compares the duty cycle Vdu for the V phase against the carrier C, and then outputs a compared result by using a pulse. Specifically, the comparator 17 compares a value for the duty cycle Vdu against the amplitude of the carrier C. The comparator 17 outputs an "H" signal during a period in which the amplitude of the carrier C is greater than or equal to that of the duty cycle Vdu. In contrast, the comparator 17 outputs an "L" signal during a period in which the amplitude of the carrier C is less than that of the duty cycle Vdu.

The comparator 18 compares the duty cycle Udu for the W phase against the carrier C, and then outputs a compared result by using a pulse. Specifically, the comparator 18 compares a value for the duty cycle Wdu against the amplitude of the carrier C. The comparator 18 outputs an "H" signal during a period in which the amplitude of the carrier C is greater than or equal to that for the duty cycle Wdu. In contrast, the comparator 18 outputs an "L" signal during a period in which the amplitude of the carrier C is less than that of the duty cycle Wdu.

Based on the outputs from the comparators 16, 17, and 18, the PWM circuit 108 outputs six PWM signals each of which has an on-off period that is set in accordance with changes in a voltage command for a corresponding phase. The six PWM signals include a PWM signal for driving the switching element of the upper arm for the U phase, a PWM signal for driving the switching element of the lower arm for the U phase, a PWM signal for driving the switching element of the upper arm for the V phase, a PWM signal for driving the switching element of the lower arm for the V phase, a PWM signal for driving the switching element of the upper arm for the W phase, and a PWM signal for driving the switching element of the lower arm for the W phase. The six PWM signals are respectively provided to gates of the switching elements of the inverter 23. Each switching element is turned on or off by a corresponding PWM signal among the six PWM signals. In such a manner, the inverter 23 outputs respective voltages for the U phase, V phase, and W phase and then applies the voltages to the motor 4. Note that as a specific energization method, triangle wave comparison is employed in the first embodiment. However, there is no limitation to the triangle wave comparison, and another system such as a spatial vector model may be employed to output a given voltage for each phase.

The PWM circuit 108 generates an interrupt signal at a timing at which, for example, a given PWM signal rises, and causes the interrupt signal to be input to the interrupt controller 109. In response to receiving the interrupt signal from the PWM circuit 108, the interrupt controller 109 provides a command for A/D conversion to the current detector 27. Thus, the current detector 27 performs A/D conversion for the detection signal Sd at a timing at which the interrupt signal is generated.

Figure 3:
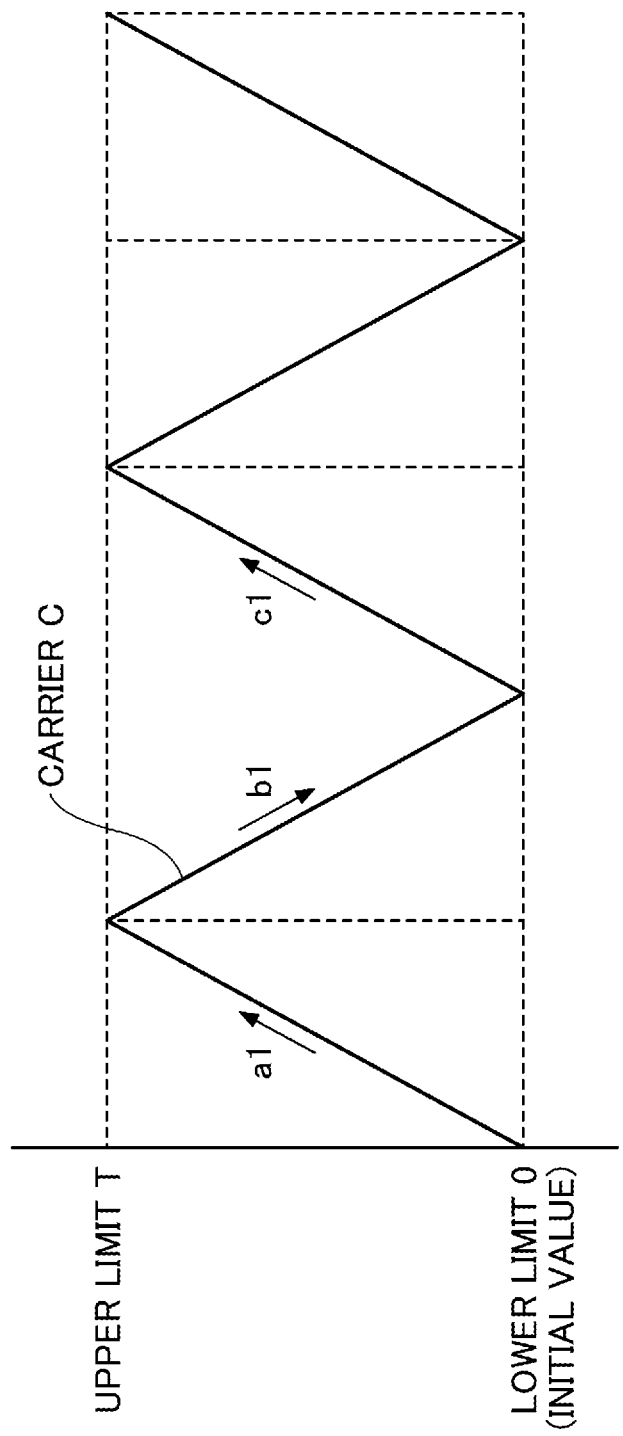
FIG. 3 is a diagram for describing the principle of generating a triangle wave carrier for each phase.

Hereafter, the principle of generating the triangular wave carrier for each phase will be described with reference to FIG. 2 and FIG. 3. FIG. 3 is a diagram illustrating the principle of generating a triangular wave carrier for each phase. The waveform of the carrier C is illustrated in FIG. 3.

In FIG. 2, when the start signal of counting is input to the up-down counter 12, the up-down counter 12 starts counting a clock from the clock generator 36. As described above, in the up-down counter 12, the initial value is set, where the initial value is, for example, set to zero. Thus, the up-down counter 12 starts counting from zero. The output of the flip flop 15 to instruct the up-down counter 12 to count up or down in total is set to "H" in an initial state. The initial state is an output state of the flip flop 15 at a timing at which the command signal of the initial value is received. In such a manner, the up-down counter 12 starts counting to increment a count value in total. As a result, as illustrated in FIG. 3, the output of the up-down counter 12 increases with time, from zero, indicating the lower limit (initial value), toward an upper limit T, as expressed by the arrow a1.

Then, when the count value reaches the upper limit T, the comparator 13 detects it and outputs the detection signal INT1 to the flip flop 15. In response to such a signal, the flip flop 15 inverts an output to output an "L" signal. Thus, the operation of the up-down counter 12 shifts from an increment operation to a decrement operation. As a result, as illustrated in FIG. 3, the output of the up-down counter decreases with time, from the upper limit T to zero of the lower limit, as expressed by the arrow b1.

Then, when the count value reaches the lower limit of zero, the comparator 14 detects it and provides the detection signal INT2 to the flip flop 15. In response to such a signal, the flip flop 15 inverts an output to output an "H" signal. Thus, the operation of the up-down counter 12 again shifts to the increment operation, and the output of the up-down counter is increased, from zero of the lower limit toward the upper limit T, as expressed by the arrow c1.

By repeating the increment and decrement operations described above, the up-down counter 12 outputs the triangular wave carrier C, as illustrated in FIG. 3.

Note that in the first embodiment, the carrier C is generated at a valley (lower limit), but may be generated at a peak (upper limit). In this case, an initial value of the carrier C indicates T (upper limit), and an initial command value indicates "L", where a given phase is at an offset by one half of a period, compared to the carrier generated at the valley.

Note that in the first embodiment, the carrier C is output using a triangle wave, but may be output using a sawtooth wave or the like, which is achieved by an output compare function.

Figure 4:
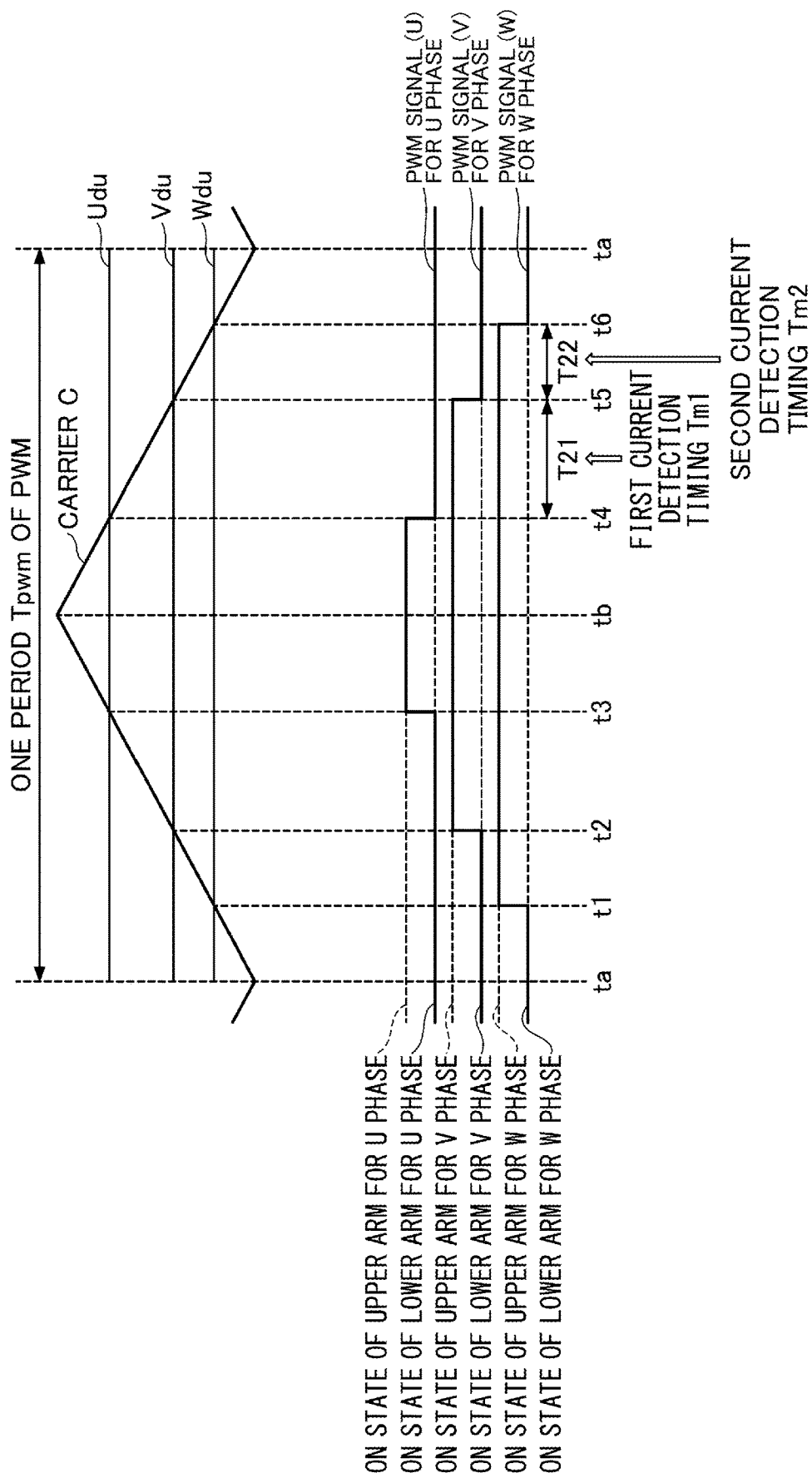
FIG. 4 is a diagram illustrating waveforms of a plurality of PWM signals U, V, and W, a waveform of a carrier C set within one period of each PWM signal, and waveforms of duty cycles Udu, Vdu, and Wdu for respective phases.

FIG. 4 is a diagram illustrating the waveforms of the multiple PWM signals U, V, and W, the waveform of the carrier C set during one period of each PWM signal, and waveforms of the duty cycle Udu, Vdu, and Wdu for respective phases.

As illustrated in FIG. 4, each of the multiple PWM signals U to W is generated such that a high level and low level are inverted at a timing at which a corresponding duty cycle among the duty cycles Udu, Vdu, and Wdu for respective phases meets the carrier C.

The PWM signal U is a PWM signal for driving two switching elements that constitute the upper and lower arms for the U phase. In FIG. 4, the PWM signal U is expressed as a "PWM signal (U) for U phase". When the PWM signal U is at a low level, the switching element of the lower arm for the U phase is on (the switching element of the upper arm for the U phase is off), and when the PWM signal U is at a high level, the switching element of the lower arm for the U phase is off (the switching element of the upper arm for the U phase is on). In response to changes in the level of the PWM signal U, two switching elements constituting the upper and lower arms for the U phase are turned on or off complementarily.

The PWM signal V is a PWM signal for driving two switching elements that constitute the upper and lower arms for the V phase. In FIG. 4, the PWM signal V is expressed as a "PWM signal (V) for V phase". When the PWM signal V is at a low level, the switching element of the lower arm for the V phase is on (the switching element of the upper arm for the V phase is off), and when the PWM signal V is at a high level, the switching element of the lower arm for the V phase is off (the switching element of the upper arm for the V phase is on). In response to changes in the level of the PWM signal V, two switching elements constituting the upper and lower arms for the V phase are turned on or off complementarily.

The PWM signal W is a PWM signal for driving two switching elements that constitute the upper and lower arms for the W phase. In FIG. 4, the PWM signal W is expressed as a "PWM signal (W) for W phase". When the PWM signal W is at a low level, the switching element of the lower arm for the W phase is on (the switching element of the upper arm for the W phase is off), and when the PWM signal W is at a high level, the switching element of the lower arm for the W phase is off (the switching element of the upper arm for the W phase is on). In response to changes in the level of the PWM signal W, two switching elements constituting the upper and lower arms for the W phase are turned on or off complementarily.

Note that the timing at which a given PWM signal among the PWM signals U to W changes from the low level to the high level is slightly later than the timing at which a corresponding duty cycle among the duty cycles Udu, Vdu, and Wdu for respective phases meets the carrier C. This is because dead time is required to prevent short-circuiting of a given upper arm and lower arm. In FIG. 4, illustration of the dead time is omitted for the purpose of illustration. In the following description, the PWM signals U to W may be referred to as "PWM signals", when they are not distinguished.

As illustrated in FIG. 4, in one period Tpwm of each of the PWM signals U to W, change points (t1 to t6) of a corresponding PWM signal among the multiple PWM signals U to W are defined as follows.

A change point t1 is a timing (timing at which the upper arm for the W phase is changed from off to on) at which the lower arm for the W phase is changed from on to off. A change point t2 is a timing (timing at which the upper arm for the V phase is changed from off to on) at which the lower arm for the V phase is changed from on to off. A change point t3 is a timing (timing at which the upper arm for the U phase is changed from off to on) at which the lower arm for the U phase is changed from on to off. A change point t4 is a timing (timing at which the upper arm for the U phase is changed from on to off) at which the lower arm for the U phase is changed from off to on. A change point t5 is a timing (timing at which the upper arm for the V phase is changed from on to off) at which the lower arm for the V phase is changed from off to on. A change point t6 is a timing (timing at which the upper arm for the W phase is changed from on to off) at which the lower arm for the W phase is changed from off to on.

In the present embodiment, a first current detection timing Tm1 is defined within a period from t4 to t5, and a second current detection timing Tm2 is defined within a period from t5 to t6. However, the periods within which the first current detection timing Tm1 and the second current detection timing Tm2 are set are not limited to the periods described above.

In a state where the inverter 23 outputs a three-phase alternating current modulated in PWM, the current detector 27 can detect the current for a particular phase, based on a corresponding pattern among the energization patterns for the switching elements 25U+, 25V+, and 25W+ that are on the upper arms side. Alternatively, in a state where the inverter 23 outputs a three-phase alternating current modulated in PWM, the current detector 27 may detect the current for a particular phase, based on a corresponding pattern among the energization patterns for the switching elements 25U−, 25V−, and 25W− that are on the lower arms side.

For example, as illustrated in FIG. 4, within an energizing time period T21, the magnitude of the voltage occurring across both ends of the current detection unit 24 corresponds to the magnitude of the current that is a positive phase current Iu+. The energizing time period T21 is a period from t4 to t5. The energizing time period T21 corresponds to a period during which the switching element of the lower arm for the U phase is in an on state, the switching element of the lower arm for the V phase is in an off state, and the switching element of the lower arm for the W phase is in an off state. Thus, by acquiring the detection signal Sd at the first current detection timing Tm1 set within the energizing time period T21, the current detector 27 can detect the magnitude of the current that is the positive phase current Iu+.

After a predetermined delay time td elapses from the time when the level of a given PWM signal for one phase, among the PWM signals, shifts to a different logic level from PWM signals for remaining two phases (for example, t4: a timing at which the level of a given PWM signal for the U phase changes from the same high level as levels of PWM signals for the V phase and W phase, to a different low level from levels of the PWM signals for the V phase and W phase), the current detection-timing adjusting unit 34 sets the first current detection timing Tm1. At this time, the current detection-timing adjusting unit 34 sets the first current detecting timing Tm1 within the energizing time period T21.

The delay time td is expressed by Equation (4) below. Where, Tdead represents dead time, and Tring represents the time required for ringing resulting from changes in a given PWM signal to fail to occur.

$$Td = Tdead + Tring \quad (4)$$

Also, for example, as illustrated in FIG. 4, in an energizing time period T22, the magnitude of the voltage occurring across the both ends of the current detection unit 24 corresponds to the magnitude of the current that is a negative phase current Iw−. The energizing time period T22 is a period from t5 to t6. The energizing time period T22 corresponds to a period in which the switching element for the lower arm for the U phase is in an on state, the switching element of the lower arm for the V phase is in an on state, and the switching element of the lower arm for the W phase is in an off state. Thus, by acquiring the detection signal Sd at the first current detecting timing Tm1 set within the energizing time T21, the current detector 27 can detect a negative phase current Iw−.

After a predetermined delay time td elapses from the time when the level of a given PWM signal for one phase, among the PWM signals, shifts to a different logic level from PWM signals for remaining two phases (for example, t5: a timing at which the level of a given PWM signal for the V phase changes from the same high level as a level for the W phase, to the same low level as that for the U phase, so that the level for the W phase becomes a different logical level from levels for the U phase and V phase), the current detection-timing adjusting unit 34 sets the second current detection timing Tm2. At this time, the current detection-timing adjusting unit 34 sets the second current detecting timing Tm2 within the energizing time period T22.

Likewise, the current detector 27 can also detect the magnitude of a given current for another phase.

As described above, when currents for two phases, among the phase currents Iu, Iv, and Iw, are sequentially detected based on energization patterns that include PWM signals for three phase, and then the detected currents are stored, three-phase currents can be detected by time division. In view of a total sum of the three-phase currents being zero, for modulation for three phases, if phase currents for two phases of three phases can be detected, the current detector 27 can also detect a phase current for the remaining one phase.

Here, when the amplitude relationship among the duty cycles Udu, Vdu, and Wdu changes, the on time for a duty cycle for each of one or more among a first PWM signal, a second PWM signal, and a third PWM signal also changes accordingly. Specific examples of changes in the amplitude relationship among the duty cycles Udu, Vdu, and Wdu will be described below. The first PWM signal is, for example, a PWM signal for driving the switching element of the lower arm for the U phase. The second PWM signal is, for example, a PWM signal for driving the switching element of the lower arm for the V phase. The third PWM signal is, for example, a PWM signal for driving the switching element of the lower arm for the W phase.

The motor controller 100-1 according to the first embodiment is characterized in that pulse phase adjustment is performed so as not to change the time sequence order of respective timings at which the first PWM signal, the second PWM signal, and the third PWM signal vary, even when the amplitude relationship among the duty cycles Udu, Vdu, and Wdu is changed. The "respective timings at which the first PWM signal, the second PWM signal, and the third PWM signal vary" include, for example, a timing (e.g., change point t4) at which the level of the PWM signal for the U phase illustrated in FIG. 4 changes, a timing (e.g., change point t5) at which the level of the PWM signal for the V phase illustrated in FIG. 4 changes, a timing (e.g., change point t6) at which the level of the PWM signal for the W phase illustrated in FIG. 4 changes, and the like. In the pulse phase adjustment, respective phases of the first PWM signal, the second PWM signal, and the third PWM signal shift. Specifically, in the pulse phase adjustment, a given timing (e.g., change point t4) at which the level of the PWM signal for the U phase illustrated in FIG. 4 changes, a given timing (e.g., change point t5) at which the level of the PWM signal for the V phase illustrated in FIG. 4 changes, and a given timing (e.g., change point t6) at which the level of the PWM signal for the W phase illustrated in FIG. 4, are varied. An example of the operation achieved in the pulse phase adjustment will be described with reference to FIG. 5 to FIG. 7.

Figure 5:
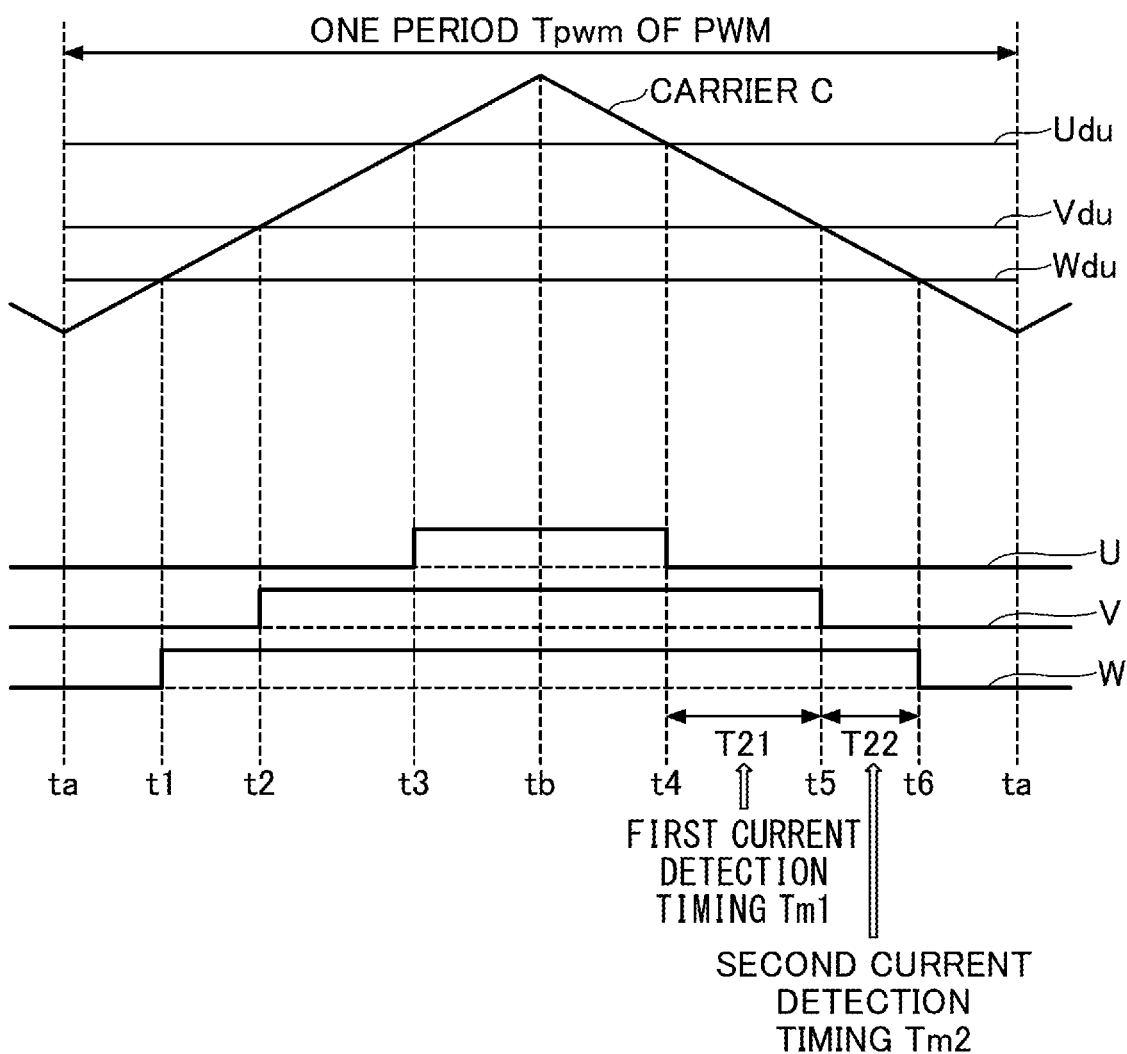
FIG. 5 is a first diagram for describing a pulse phase adjustment operation according to the first embodiment of the present invention.
Figure 6:
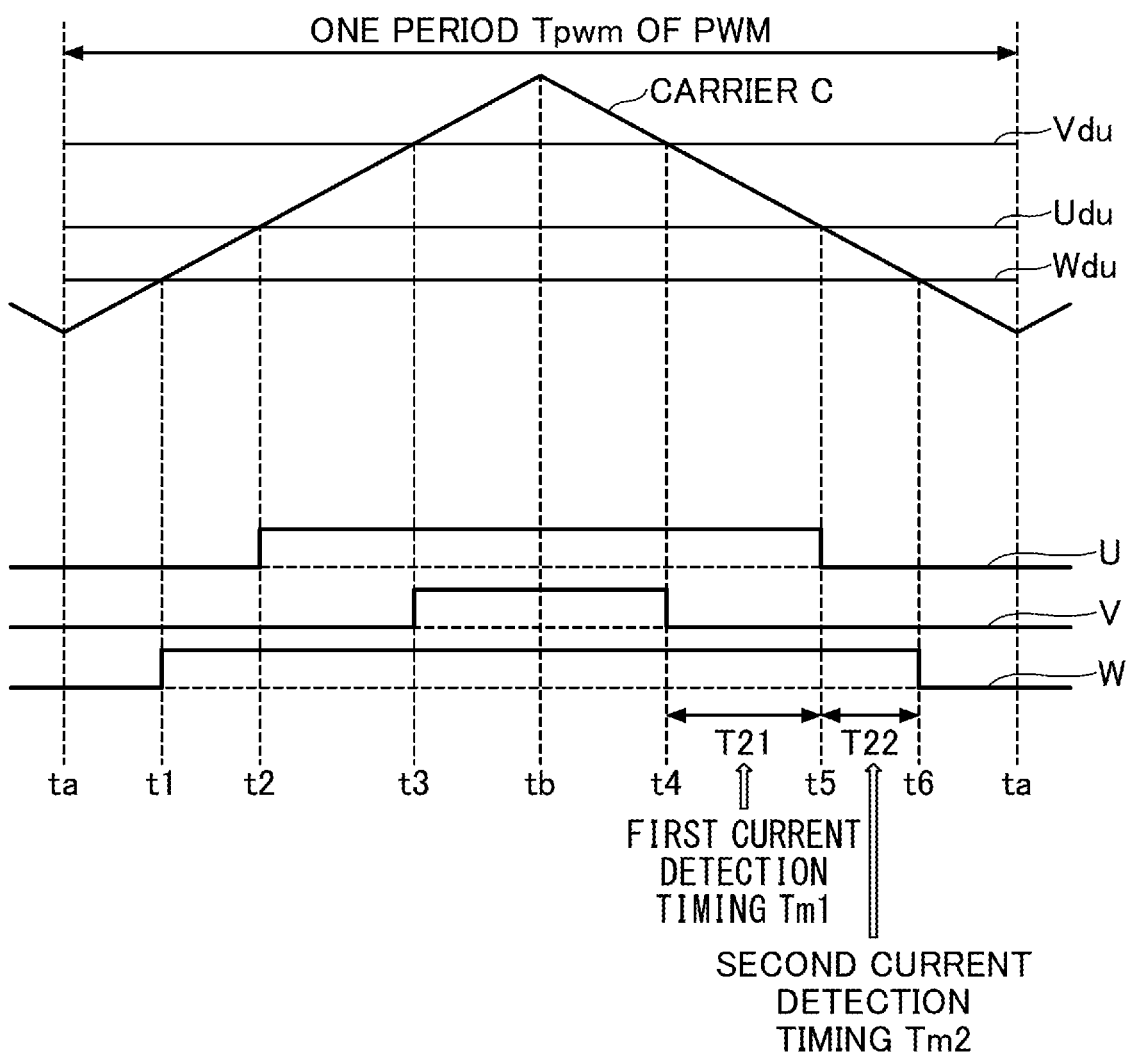
FIG. 6 is a second diagram for describing the pulse phase adjustment operation according to the first embodiment of the present invention.
Figure 7:
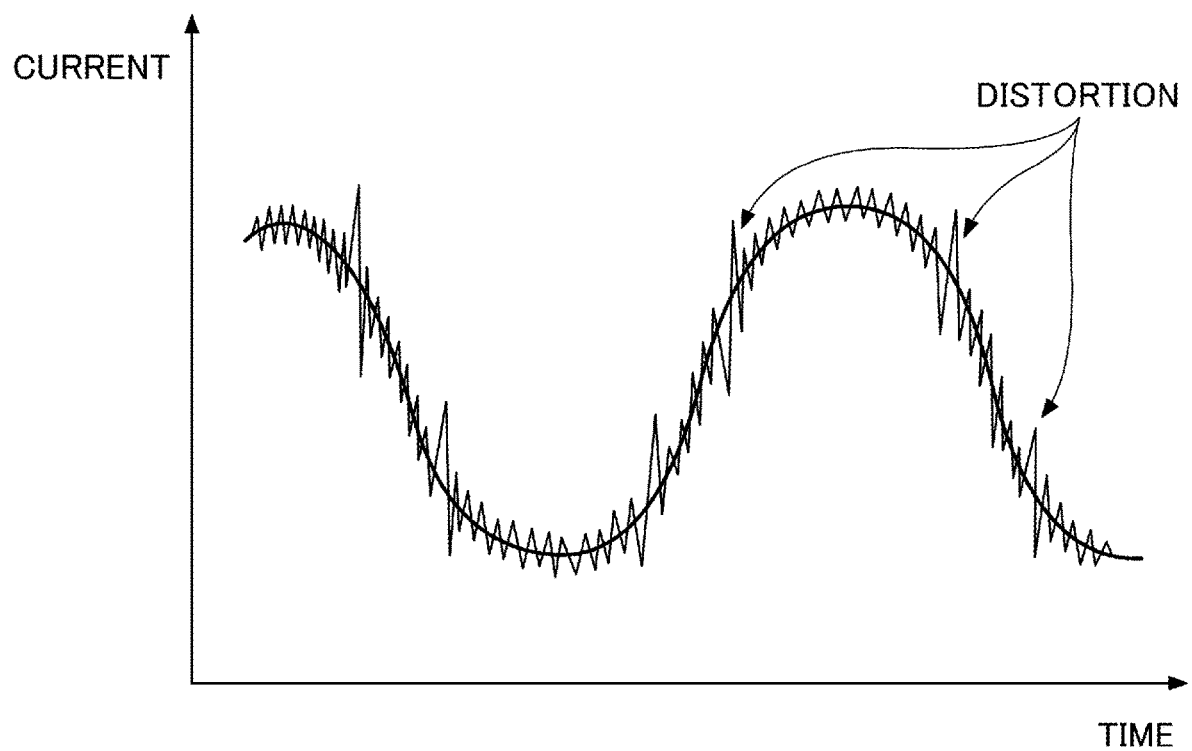
FIG. 7 is a third diagram for describing the pulse phase adjustment operation according to the first embodiment of the present invention.
Figure 8:
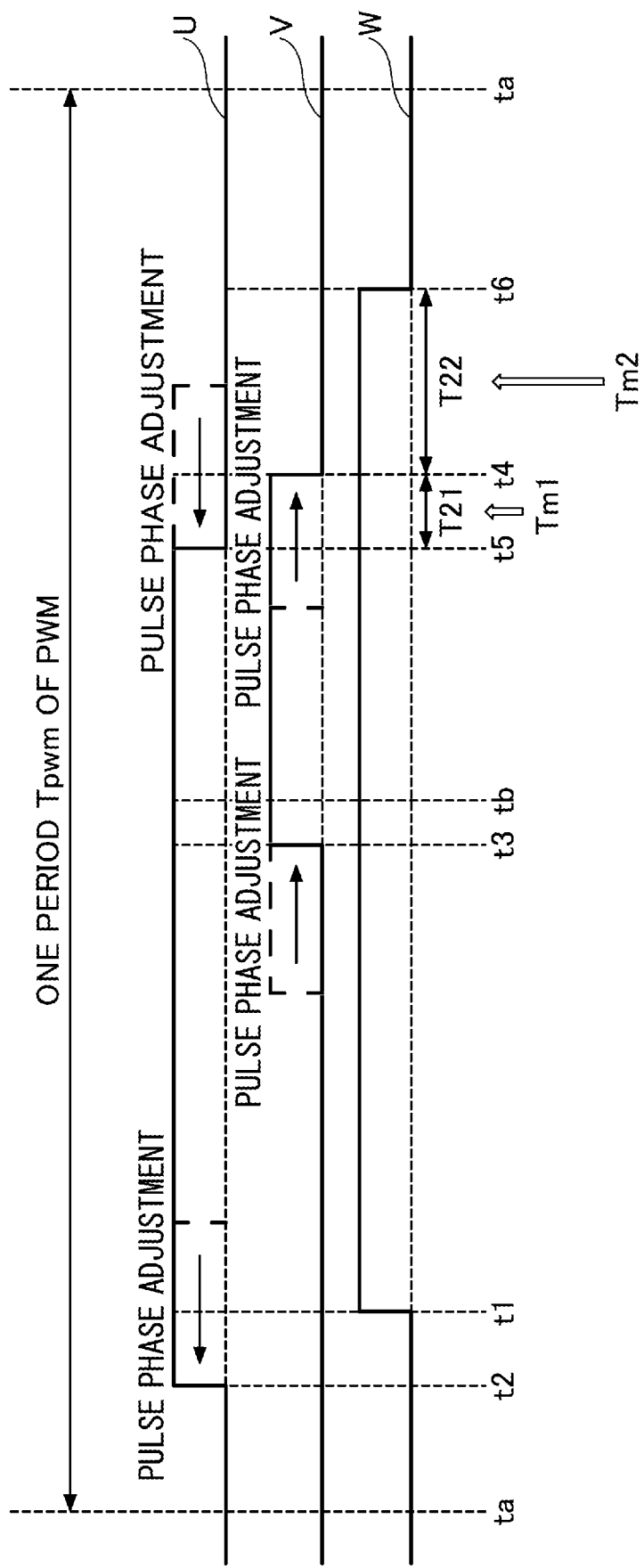
FIG. 8 is a fourth diagram for describing the pulse phase adjustment operation according to the first embodiment of the present invention.

FIG. 5 is a first diagram for describing a pulse phase adjustment operation according to the first embodiment of the present invention. FIG. 6 is a second diagram for describing the pulse phase adjustment operation according to the first embodiment of the present invention. FIG. 7 is a third diagram for describing the pulse phase adjustment operation according to the first embodiment of the present invention. FIG. 8 is a fourth diagram for describing the pulse phase adjustment operation according to the first embodiment of the present invention.

A given value for the duty cycle Udu illustrated in FIG. 5 is greater than that for the duty cycle Vdu. A given value for the duty cycle Udu illustrated in FIG. 6 is less than that for the duty cycle Vdu. In this regard, it can be seen that when the amplitude relationship between the duty cycle Udu and the duty cycle Vdu changes, timings at which the PWM signal for the U phase and the PWM signal for the V phase change, as illustrated in FIG. 6, respectively differ from timings at which the PWM signal for the U phase and the PWM signal for the V phase change, as illustrated in FIG. 5. In FIG. 5, the PWM signal for the U phase changes at the change point t4, and the PWM signal of the V phase changes at the change point t5. In contrast, in FIG. 6, the PWM signal for the V phase changes at the change point t4, and the PWM signal for the U phase changes at the change point t5.

Even in this case, because the energizing time period T21 and the energizing time period T22 are ensured, the current detection-timing adjustment unit 34 sets the first current detecting timing Tm1 within the energizing time period T21, and sets the second current detecting timing Tm2 within the energizing time period T22. Accordingly, even when the amplitude relationship between the duty cycle Udu and the duty cycle Vdu changes, current detection can be achieved.

However, distortion of a given detected current might occur with changes in a given energization pattern, as illustrated in FIG. 7. This is because there are variations in the time sequence order of timings at which the respective PWM signals change. Specifically, in FIG. 5, the order in which levels of the respective PWM signals change is the order of U, V, and W. In contrast, in FIG. 6, the order in which levels of the respective PWM signals change is set in order of V, U, and W, because the amplitude relationship between the duty cycles Udu and Vdu is reversed.

When there are variations in the timings (phases) at which multiple PWM signals change, distortion of the current flowing into the DC bus (positive-side bus 22a and negative-side bus 22b) occurs accordingly, and consequently a waveform is formed such that large noise is superimposed on the current. The distortion of the current might result in unwanted sound, thereby causing discomfort for a user, depending on devices to be coupled to the motor 4.

In order to reduce the occurrence of the current distortion described above, even when the amplitude relationship between the duty cycle Udu and Vdu changes, the motor controller 100-1 according to the present embodiment performs the pulse phase adjustment such that the time sequence order of timings at which respective PWM signals change is fixed in one arrangement order.

FIG. 8 illustrates the manner in which pulse phase adjustment is achieved for multiple PWM signals. In an example in FIG. 8, the timing (phase) at which the PWM signal for the U phase changes is shifted to a lead side. Also, the timing (phase) at which the PWM signal for the V phase changes is shifted to a lag side. Further, the time width from a shifted phase of the PWM signal for the U phase to a shifted phase of the PWM signal for the V phase is set to a width that enables acquiring of the detection signal Sd at the first current detection timing Tm1.

Figure 9:
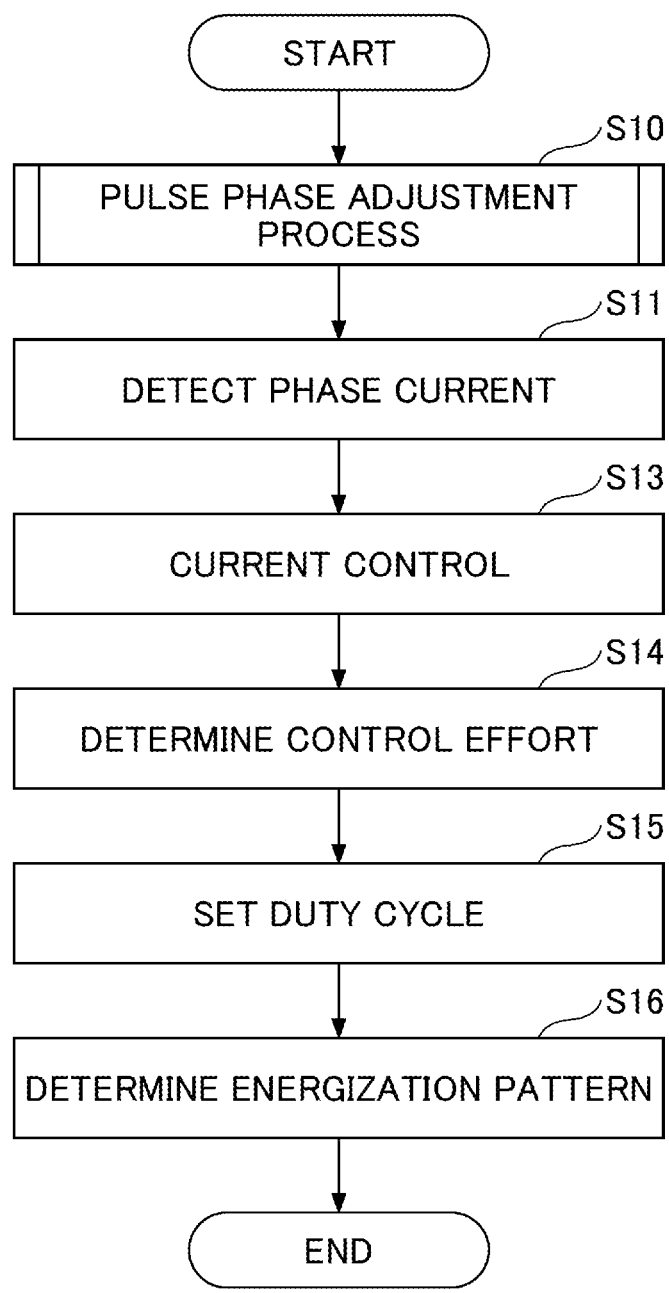
FIG. 9 is a flowchart illustrating the operation of a motor controller 100-1.

Hereafter, the operation of the motor controller 100-1 will be described. FIG. 9 is a flowchart illustrating the operation of the motor controller 100-1. In the present embodiment, a PWM counter interrupt process illustrated in FIG. 9 is performed at each timing of a phase to with respect to the bottom of the carrier C.

In step S10, the PWM signal generator 32 performs a pulse phase adjustment process. The pulse phase adjustment process will be described below in detail.

In step S11, the current detector 27 detects the phase currents Iu, Iv, and Iw for the U, V, and W phases. An interrupt process (for example, an interrupt process in which AD conversion is performed for the detection signal Sd) of current detection in which the current detector 27 acquires the detection signal Sd is performed twice within one period Tpwm of the carrier C (see FIGS. 10 and 11), in addition to the process illustrated in FIG. 9.

Figure 10:
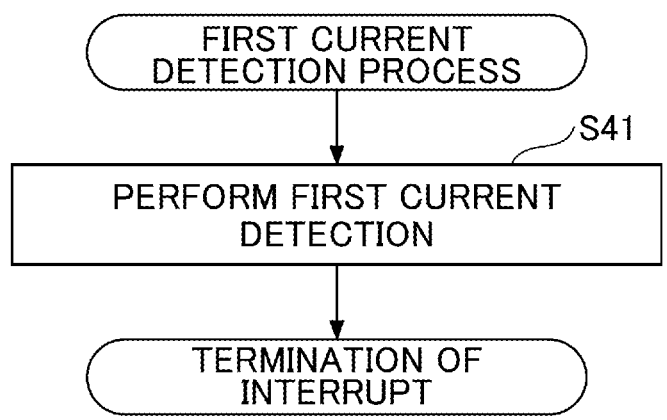
FIG. 10 is a flowchart illustrating an example of a first current detection process.

FIG. 10 is a flowchart illustrating an example of a first current detection process. When a count value at a carrier counter matches a value corresponding to a value set when the delay time td elapses from t4, the current detection-timing adjusting unit 34 asserts a setting register for the first current detection timing Tm1. When the setting register for the first current detection timing Tm1 is asserted, the current detector 27 acquires the detection signal Sd by using an AD converter (step S41), and then stores an acquired value of the detection signal Sd in a first acquisition register.

Figure 11:
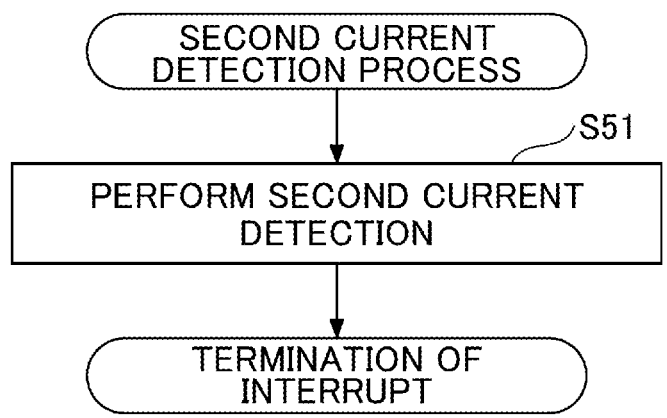
FIG. 11 is a flowchart illustrating an example of a second current detection process.

FIG. 11 is a flowchart illustrating an example of a second current detection process. When a count value of the carrier counter matches a value corresponding to a value set when the delay time td elapses from t5, the current detection-timing adjusting unit 34 asserts a setting register for the second current detection timing Tm2. When the setting register for the second current detection timing Tm2 is asserted, the current detector 27 acquires the detection signal Sd by using an AD converter (step S51), and then stores an acquired value of the detection signal Sd in a second acquisition register.

The current detector 27 detects the three-phase currents Iu, Iv, and Iw, based on setting values of the detection signals Sd that are respectively stored in the first acquisition register and the second acquisition register.

The vector control unit 30 performs current control, such as PI control, based on calculated magnitudes of the three-phase currents Iu, Iv, and Iw that are detected by the current detector 27 (step S13). Then, the vector control unit 30 calculates phase voltage commands Vu*, Vv*, and Vw* (control efforts) for respective phases (step S14).

In step S15, the duty-cycle setting unit 31 sets duty cycles for the phases, based on the respective phase voltage commands Vu*, Vv*, and Vw* for the phases calculated in step S14. Then, in step S16, the PWM signal generator 32 determines which energization pattern among the energization patterns is used to control the energizing of the inverter 23, based on the duty cycles for the phases set by the duty-cycle setting unit 31.

Figure 12:
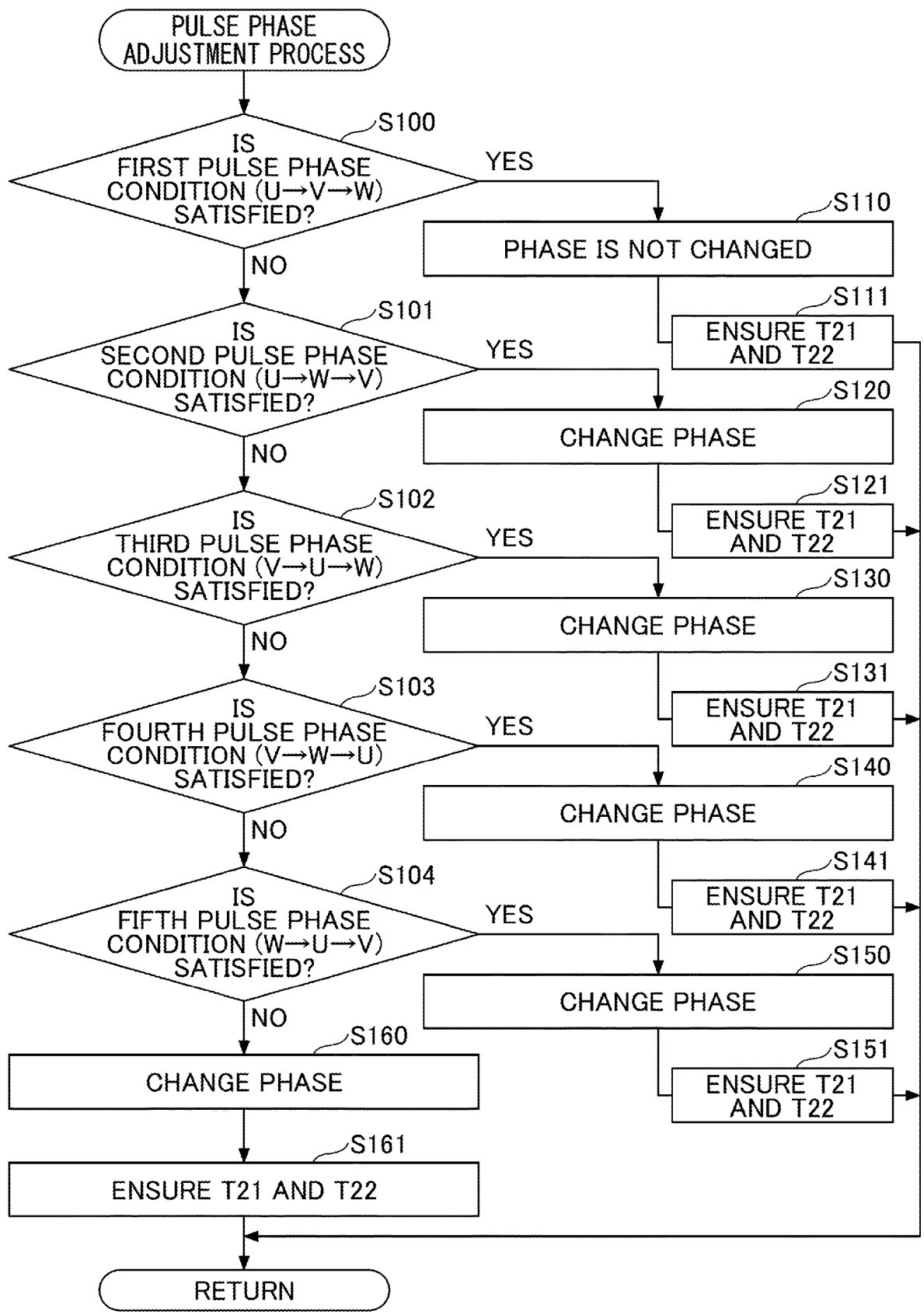
FIG. 12 is a flowchart for describing the operation relating to a pulse phase adjustment process.

Hereafter, the operation relating to the pulse-phase adjustment process will be described. FIG. 12 is a flowchart for description of the operation relating to the pulse-phase adjustment process. In the PWM signal generator 32, multiple pulse conditions are set as follows.

The pulse phase conditions described below are conditions which are each with respect to the order of timings at which pulses change is set, e.g., order of U, V, and W. For example, when the order of timings at which pulses change is set, e.g., order of V, U, and W, or the like, in a case where the pulses sequentially change in the same order as the order as set, phases are not changed, phases are not changed. Otherwise, the phases are changed.

Under a first pulse phase condition, when the carrier counter decrements a count, U, V, and W are arranged in this order from a phase lead side, with respect to arrangement of the PWM signals U, V, and W.

Under a second pulse phase condition, when the carrier counter decrements a count, U, W, and V are arranged in this order from a phase lead side, with respect to arrangement of the PWM signals U, V, and W.

Under a third pulse phase condition, when the carrier counter decrements a count, V, U, and W are arranged in this order from a phase lead side, with respect to arrangement of the PWM signals U, V, and W.

Under a fourth pulse phase condition, if the carrier counter decrements a count, V, W, and U are arranged in this order from a phase lead side, with respect to arrangement of the PWM signals U, V, and W.

Under a fifth pulse phase condition, if the carrier counter decrements a count, W, U, and V are arranged in this order from a phase lead side, with respect to arrangement of the PWM signals U, V, and W.

Under a sixth pulse phase condition, if the carrier counter decrements a count, W, V, and U are arranged in this order from a phase lead side, with respect to arrangement of the PWM signals U, V, and W.

In step S100, the PWM signal generator 32 determines whether the first pulse phase condition is satisfied.

If the first pulse phase condition is satisfied (Yes in step S100), timings at which, under the condition in which the carrier counter decrements a count, the PWM signal for the U phase, the PWM signal for V phase, and the PWM signal for W phase respectively change, are detected in order of U, V, and W. Thus, without changing the phases of the PWM signal for the U phase, the PWM signal for V phase, and the PWM signal for W phase (step S110), the PWM signal generator 32 performs a process of ensuring current detection periods (energizing time periods T21 and T22) in step S111, and then performs the process in step S11 illustrated in FIG. 9.

If the first pulse phase condition is not satisfied (No in step S100), the process in step S101 is performed. In step S101, the PWM signal generator 32 determines whether the second pulse phase condition is satisfied.

If the second pulse phase condition is satisfied (Yes in step S101), timings at which, under the condition in which the carrier counter decrements a count, the PWM signal for the U phase, the PWM signal for the V phase, and the PWM signal for the W phase respectively change, are detected in order of U, W, and V. Thus, the PWM signal generator 32 changes the respective phases of the PWM signal for the W phase and the PWM signal for the V phase (step S120), and then performs the process of ensuring current detection periods (energizing time periods T21 and T22) in step S121. Subsequently, the PWM signal generator 32 performs the process in step S11 illustrated in FIG. 9. In step S120, for example, a given timing (phase) at which the PWM signal for the W phase changes shifts to a lag side. Also, a given timing (phase) at which the PWM signal for the V phase changes shifts to a lead side.

If the second pulse phase condition is not satisfied (No in step S101), the process in step S102 is performed. In step S102, the PWM signal generator 32 determines whether the third pulse phase condition is satisfied.

If the third pulse phase condition is satisfied (Yes in step S102), timings at which under the condition in which the carrier counter decrements a count, the PWM signal for the U phase, the PWM signal for V phase, and the PWM signal for W phase respectively change are detected in order of V, U, and W. Thus, the PWM signal generator 32 changes the respective phases of the PWM signal for the V phase and the PWM signal for U phase (step S130), and then performs the process of ensuring current detection periods (energizing time periods T21 and T22) in step S131. Subsequently, the PWM signal generator 32 performs the process in step S11 illustrated in FIG. 9. In step S130, for example, a given timing (phase) at which the PWM signal for the V phase changes shifts to a lag side. Also, a given timing (phase) at which the PWM signal for the U phase changes shifts to a lead side.

If the third pulse phase condition is not satisfied (No in step S102), the process in step S103 is performed. In step S103, the PWM signal generator 32 determines whether the fourth pulse phase condition is satisfied.

If the fourth pulse phase condition is satisfied (Yes in step S103), timings at which, under the condition in which the carrier counter decrements a count, the PWM signal for the U phase, the PWM signal for V phase, and the PWM signal for W phase respectively change, are detected in order of the PWM signal for V phase, the PWM signal for the W phase, and the PWM signal for the U phase. Thus, the PWM signal generator 32 changes the respective phases of the PWM signal for the V phase, the PWM signal for the W phase, and the PWM signal for the U phase (step S140), and then performs the process of ensuring current detection periods (energizing time periods T21 and T22) in step S141. Subsequently, the PWM signal generator 32 performs the process in step S11 illustrated in FIG. 9. In step S140, for example, a given timing (phase) at which the PWM signal for the V phase changes shifts to a lag side. Also, a given timing (phase) at which the PWM signal for the U phase changes shifts to a lead side.

If the fourth pulse phase condition is not satisfied (No in step S103), the process in step S104 is performed. In step S104, the PWM signal generator 32 determines whether the fifth pulse phase condition is satisfied.

If the fifth pulse phase condition is satisfied (Yes in step S104), timings at which, under the condition in which the carrier counter decrements a count, the PWM signal for the U phase, the PWM signal for the V phase, and the PWM signal for the W phase respectively change, are detected in order of W, U, and V. Thus, the PWM signal generator 32 changes the phases of the respective PWM signals (step S150), and then performs the process of ensuring current detection periods (energizing time periods T21 and T22) in step S151. Subsequently, the PWM signal generator 32 performs the process in step S11 illustrated in FIG. 9. In step S150, for example, a given timing (phase) at which the PWM signal for the W phase changes shifts to a lag side. Also, a given timing (phase) at which the PWM signal for the U phase changes shifts to a lead side. Further, a given timing (phase) at which the PWM signal for the V phase changes shifts to a lead side.

If the fifth pulse phase condition is not satisfied (No in step S104), the process in step S160 is performed. The remaining pulse phase condition is a sixth pulse condition, or a case of detecting the timing at which pulses for two or more phases among all phases change simultaneously. In this case, timings at which, under the condition in which the carrier counter decrements a count, the PWM signal for the U phase, the PWM signal for the V phase, and the PWM signal for the W phase respectively change, are detected in order of W, V, and U. Thus, the PWM signal generator 32 changes phases of the respective PWM signals (step S160), and then performs the process of ensuring current detection periods (energizing time periods T21 and T22) in step S161. Subsequently, the PWM signal generator 32 performs the process in step S11 illustrated in FIG. 9. In step S160, for example, a given timing (phase) at which the PWM signal for the W phase changes shifts to a lag side. Also, a given timing (phase) at which the PWM signal for the V phase changes shifts to a lag side. Further, a given timing (phase) or the like at which the PWM signal for the U phase changes shifts to a lead side. In such a manner, the detection order is varied such that detection is performed in order of U, V, and W.

Note that the PWM signal generator 32 according to the present embodiment generates PWM signals for respective phases, by using the carrier C in common with the phases. In other words, in the present embodiment, carriers C used for the respective phases are not generated. Further, in the present embodiment, a given triangle wave that is bilaterally symmetrical with respect to a phase tb is used as the carrier C, and thus a circuit configuration that generates the waveform of a given PWM signal for each phase can be simplified. The carrier counter decrements a count up to the phase ta, increments a count from the phase ta to the phase tb, and decrements a count after the phase tb. In such a manner, an increment period and a decrement period are repeated.

Note that the present embodiment is described in which the first PWM signal is a PWM signal for the U phase, the second PWM signal is a PWM signal for the V phase, and the third PWM signal is a PWM signal for the W phase. However, types of the first PWM signal, second PWM signal, and third PWM signal are not limited to the example described above.

As described above, a motor controller 100-1 according to the first embodiment includes an inverter configured to drive a motor based on a first PWM signal, a second PWM signal, and a third PWM signal. The motor controller includes a current detection unit configured to output a detection signal corresponding to a magnitude of a current flowing into a direct current line of the inverter. The motor controller includes a current detector configured to detect a phase current for each phase, by obtaining the detection signal. The motor controller includes a duty-cycle setting unit configured to set a duty cycle of each of the first PWM signal, the second PWM signal, and the third PWM signal, based on a corresponding detected value for a given phase. The motor controller includes a PWM signal generator configured to generate each of the first PWM signal, the second PWM signal, and the third PWM signal, by comparing a setting value of a corresponding duty cycle against a level of a carrier, the level of the carrier increasing or decreasing periodically. The PWM signal generator is configured to adjust, upon occurrence of a condition in which a given setting value changes, a time sequence order of timings at which the first PWM signal, the second PWM signal, and the third PWM signal respectively change after a change in the given setting value, to be the same as a time sequence order of timings at which the first PWM signal, the second PWM signal, and the third PWM signal respectively change prior to the change in the given setting value, so that a first energization time period and a second energization time period are ensured within half of one period of the carrier. The first energization time period has an energization width in which the current detector enables detecting of a given phase current for any one of phases. The second energization time period has an energization width in which the current detector enables detecting of a given phase current for any one of the phases.

By such a configuration, there are no variations in the timing at which phases of PWM signals change, and thus the distortion of the current flowing into the DC bus (positive-side bus 22a and negative-side bus 22b) is prevented. Therefore, the occurrence of unwanted sound can be reduced without superimposing noise resulting in the unwanted sound on the current. In addition, the occurrence of distortion of the current is avoided and thus harmonics can be suppressed. Accordingly, because a higher power factor can be maintained, losses of the power of the driving motor 4 are reduced.

Second Embodiment

Figure 13:
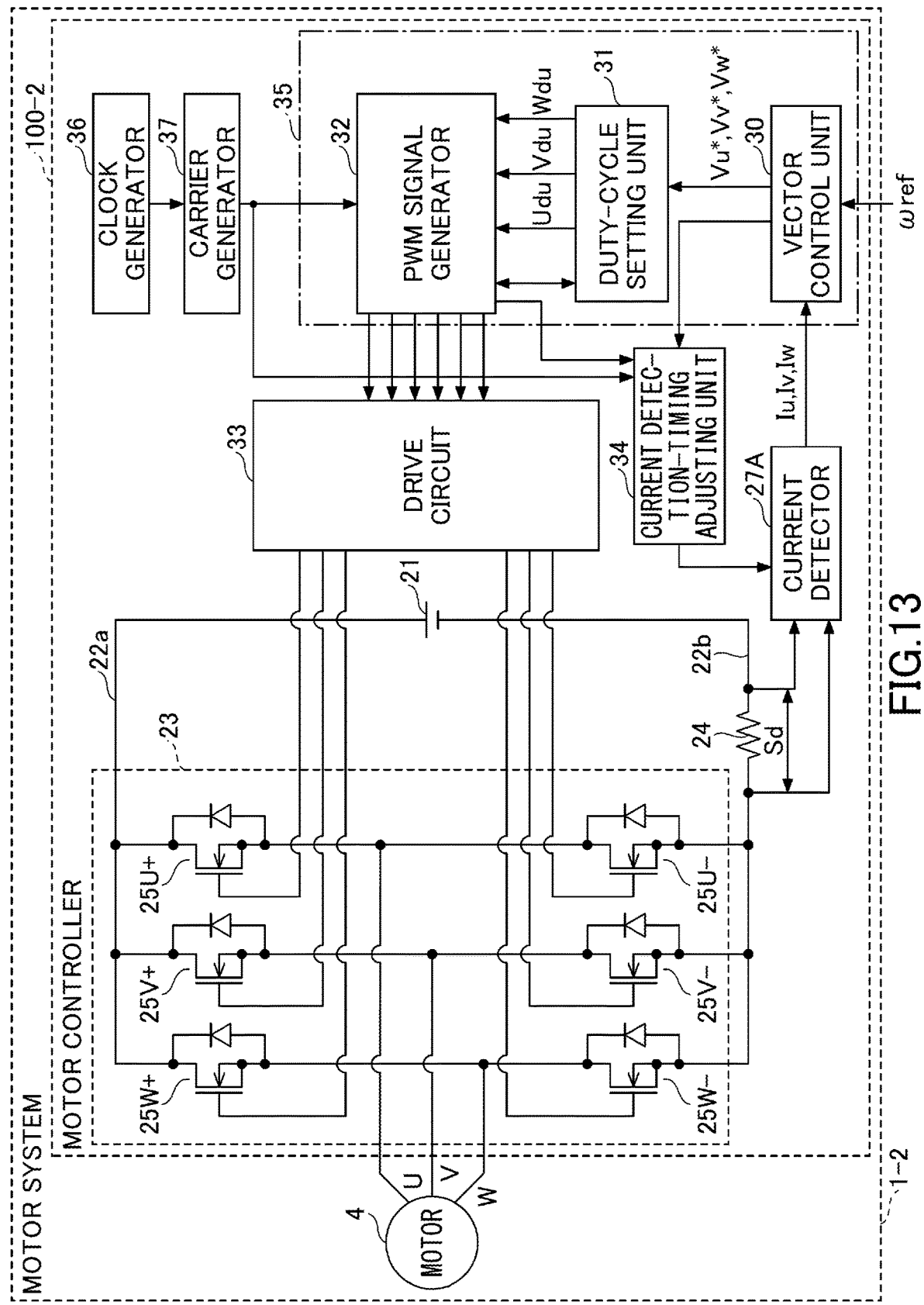
FIG. 13 is a diagram illustrating an example of the configuration of a motor system 1-2 according to a second embodiment of the present invention.

FIG. 13 is a diagram illustrating an example of the configuration of a motor system 1-2 according to a second embodiment of the present invention. The configuration of the second embodiment differs from the first embodiment, in that the motor system 1-2 includes a motor controller 100-2, instead of the motor controller 100-1. The motor controller 100-2 also includes a current detector 27A, instead of the current detector 27.

Figure 15:
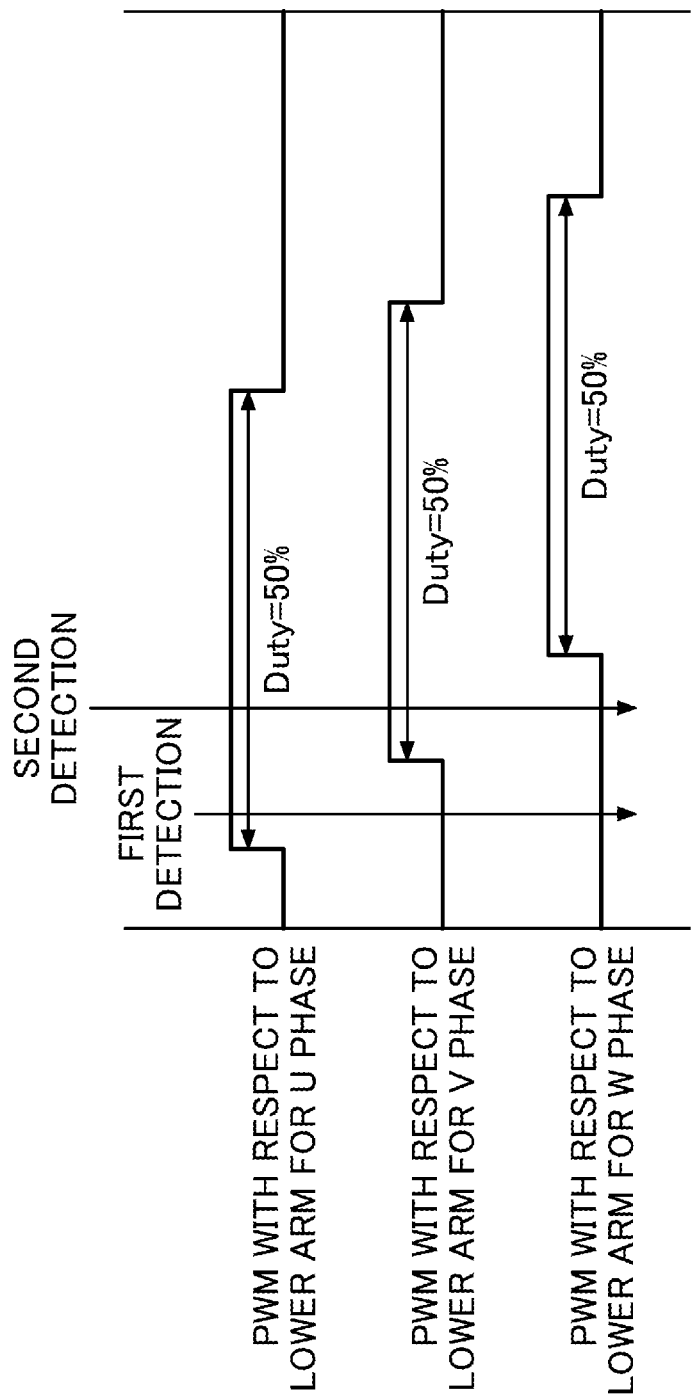
FIG. 15 is a diagram illustrating the current detected when a voltage of 0 (V) is applied.

FIG. 15 is a diagram illustrating the current detected under a condition of an applied voltage V=0. As illustrated in FIG. 15, when the on time for a 50% duty cycle is set for each of three PWM signals (applied voltage V=0), the current detector 27A detects the current twice at different timings, as illustrated in FIG. 15, and stores the detected current magnitudes (detected values). In FIG. 15, first current detection is performed when the PWM signal for the lower arm for the U phase is on, the PWM signal for the lower arm for the V phase is off, and the PWM signal for the lower arm for the W phase is off. Subsequently, second current detection is performed when the PWM signal for the lower arm for the U phase is on, the PWM signal for the lower arm for the V phase is on, and the PWM signal for the lower arm for the W phase is off. The current detector 27A is configured to perform current detection twice during operation, subtract a previously stored detected value from a corresponding detected current magnitude (the current is set at an offset), and perform a control by using the resulting current magnitude.

The current detector 27A outputs each of a first current magnitude and a second current magnitude, as a detected value. Where, the first current magnitude is obtained by subtracting a second current flowing into the motor upon occurrence of a condition (average voltage magnitude=0), in which a voltage, of which an average voltage magnitude is 0 V, is applied to the motor 4, in conjunction with a condition in which only a first PWM signal (e.g., UH) is on, from a first current flowing into the motor upon occurrence of a condition (average voltage magnitude is not zero) in which a voltage of which an average voltage magnitude is a magnitude other than 0 V is applied to the motor 4, in conjunction with a condition in which, e.g., only the first PWM signal is on. The second current magnitude is obtained by subtracting a fourth current flowing into the motor upon occurrence of a condition (average voltage magnitude=0) in which a voltage of which the average voltage magnitude is 0 V is applied to the motor 4, in conjunction with a condition in which either only a second PWM signal or only a third PWM signal is off, from a third current flowing into the motor upon occurrence of a condition (average voltage magnitude is not zero) in which a voltage of which the average voltage magnitude is a magnitude other than 0 V is applied to the motor 4, in conjunction with a condition in which, e.g., either only the second PWM signal or only the third PWM signal (e.g., WH) is off.

Under a condition in which the on time for a 50% duty cycle is set for each of three PWM signals, when a voltage of which the average voltage magnitude is 0 V is applied to the motor 4, the second current is a current to be detected in a state where only the first PWM signal is on. The current detector 27A stores information indicating the magnitude of the second current.

The first current is a current to be detected in a state in which when the motor 4 is driven, only the first PWM signal is on.

Under a condition in which the on time for a 50% duty cycle is set for each of three PWM signals, when a voltage of which the average voltage magnitude is 0 V is applied to the motor 4, the fourth current is a current to be detected in a state where either only the second PWM signal or only the third PWM signal is off. The current detector 27A stores information indicating the magnitude of the fourth current.

The third current is a current to be detected in a state in which when the motor 4 is driven, either only the second PWM signal or only the third PWM signal is off.

When the motor 4 is driven, the current detector 27A subtracts a previously stored magnitude of the second current from the magnitude of the first current, and outputs the result as a detected value. The current detector 27A subtracts a previously stored magnitude of the fourth current from the magnitude of the third current, and outputs the result as a detected value. The energization pattern generator 35 generates a PWM signal by using an output result of the current detector 27A, i.e., a current magnitude that is obtained by subtracting the second current from the first current, as well as using a current magnitude that is obtained by subtracting the fourth current from the third current. Thus, the effect of averaging detected currents can be obtained. Even when the on time for a 50% duty cycle is set, i.e., an average voltage to be applied to the motor 4 is 0 [V], in a case where current detection periods, as illustrated in T21 and T22, are set by pulse phase adjustment, the voltage is applied only within such periods, and thus the current flows. In such a manner, by detecting the current and setting a detected current magnitude as a reference (offset amount), the current changes with respect to the reference as the detected current magnitude, in a sinusoidal waveform. As a result, an increase (decrease) amount from the reference corresponds to a given current magnitude. Accordingly, the effect of averaging currents can be obtained without performing a calculation process of averaging the currents.

Note that a current offset control by the current detector 27A according to the second embodiment can be combined with a phase locked current detection system (pulse phase adjustment control) performed by the energization pattern generator 35 according to the first embodiment.

Note that in conventional methods of averaging detected currents, with variations in a detecting point of the current, or variations in a timing at which current detection is performed, even during one PWM period, the current magnitude to be detected might differ depending on which portion of a current ripple is a target for sampling. For this reason, in the conventional methods of averaging detected currents, approaches are to measure a current magnitude for the same phase multiple times to thereby average those current magnitudes. Alternatively, approaches are to correct a given current detected during a present period by using a current magnitude detected during a previous period. In contrast, with use of a combination of the phase locked current detection system (pulse phase adjustment control) according to the first embodiment and the current offset control according to the second embodiment, current detection is performed with the same energization pattern and same detection timing, and thus a ripple behavior is constant within a given current detection period of the actual flowing current. In other words, because the same step voltage is constantly applied, and thus the current changes accordingly, the current behavior is also the constant.

Figure 14:
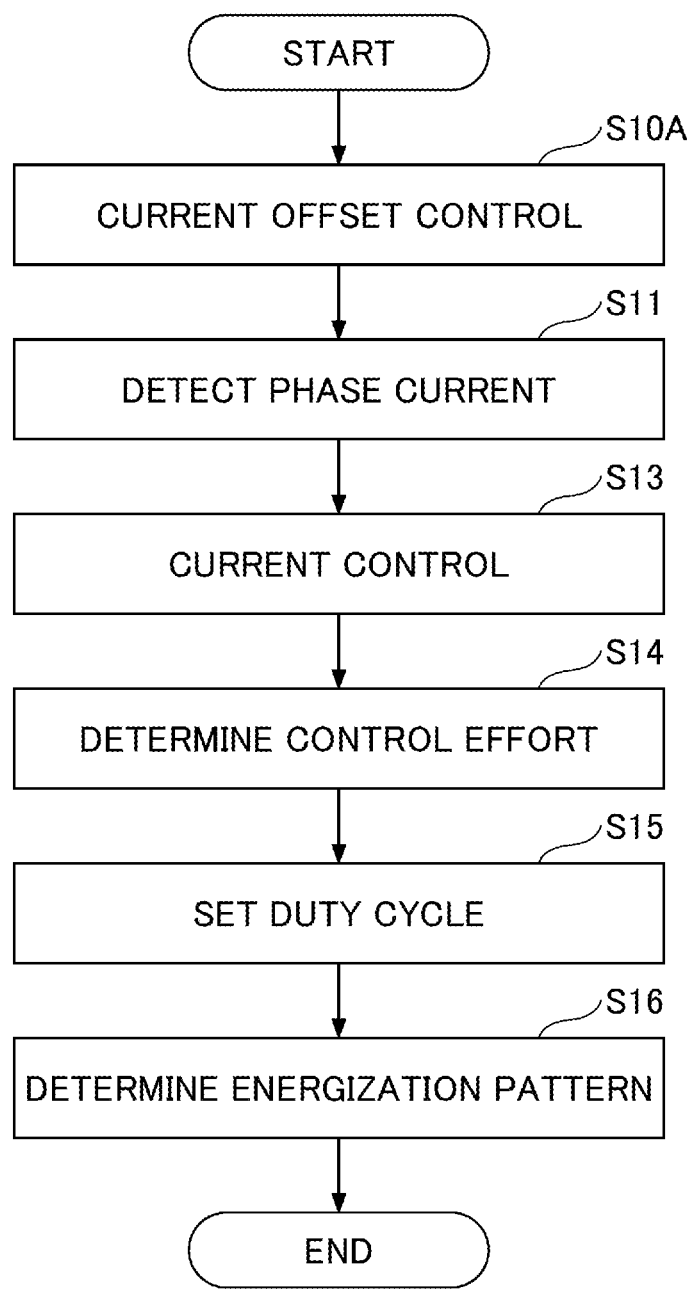
FIG. 14 is a flowchart illustrating the operation of the motor controller 100-2.

FIG. 14 is a flowchart illustrating the operation of the motor controller 100-2. The flowchart in this figure differs from the flowchart illustrated in FIG. 9, in that the process in step S10A is employed instead of the process in step S10. In step S10A, the current offset control is performed. The process after step 10A is the same as the process described in FIG. 9, and thus the description for the process will be omitted.

As described above, although the motor controller, the motor system, and the method for controlling a motor have been described according to the embodiments, the present invention is not limited to the above-described embodiments. Various changes or modifications, such as combinations or substitutions of some or all of embodiments, can be made within the scope of the present invention.

This International Application claims priority to Japanese Patent Application No. 2019-057288, filed Mar. 25, 2019, the contents of which are incorporated herein by reference in their entirety.

REFERENCE SIGNS LIST 1-1 motor system, 1-2 motor system, 4 motor, 12 up-down counter, 13 comparator, 14 comparator, 15 flip flop, 16 comparator, 17 comparator, 18 comparator, 21 DC power supply, 22a positive-side bus, 22b negative-side bus, 23 inverter, 24 current detection unit, 25U switching element, 25V switching element, 25W switching element, 27W current detector, 27 current detector, 30 vector control unit, 31 duty-cycle setting unit, 32 PWM signal generator, 33 drive circuit, 34 current detection-timing adjusting unit, 35 energization pattern generator, 36 clock generator, 37 carrier generator, 100-1 motor controller, 100-2 motor controller, 108 PWM circuit, 109 interrupt controller

The invention claimed is:

1. A motor controller comprising:
an inverter configured to drive a motor based on a first PWM signal, a second PWM signal, and a third PWM signal;
a current detection unit configured to output a detection signal corresponding to a magnitude of a current flowing into a direct current line of the inverter;
a current detector configured to detect a phase current for each phase, by obtaining the detection signal;
a duty-cycle setting unit configured to set a duty cycle of each of the first PWM signal, the second PWM signal, and the third PWM signal, based on a corresponding detected value for a given phase; and
a PWM signal generator configured to generate each of the first PWM signal, the second PWM signal, and the third PWM signal, by comparing a setting value of a corresponding duty cycle against a level of a carrier, the level of the carrier increasing or decreasing periodically,
wherein the PWM signal generator is configured to:
adjust, upon occurrence of a condition in which a given setting value changes, a time sequence order of timings at which the first PWM signal, the second PWM signal, and the third PWM signal respectively changes after a change in the given setting value, to be the same as a time sequence order of timings at which the first PWM signal, the second PWM signal, and the third PWM signal respectively changes prior to the change in the given setting value, so that a first energization time period and a second energization time period are ensured within half of one period of the carrier, wherein the first energization time period has an energization width in which the current detector enables detecting of a given phase current for any one of phases, and wherein the second energization time period has an energization width in which the current detector enables detecting of a given phase current for any one of the phases.

2. The motor controller according to claim 1, wherein the current detector is configured to output, as a detected value, each of a first current magnitude and a second current magnitude, wherein the first current magnitude is obtained by subtracting a current flowing into the motor upon occurrence of a condition in which a voltage of which an average voltage magnitude is 0 V is applied to the motor, in conjunction with a condition in which only the first PWM signal is on, from a current flowing into the motor upon occurrence of a condition in which a voltage of which an average voltage magnitude is a magnitude other than 0 V is applied to the motor, in conjunction with a condition in which only the first PWM signal is on, and wherein the second current magnitude is obtained by subtracting a current flowing into the motor upon occurrence of a condition in which a voltage is not applied to the motor, in conjunction with a condition in which either only the second PWM signal or only the third PWM signal is off, from a current flowing into the motor upon occurrence of a condition in which a voltage is applied to the motor, in conjunction with a condition in which either only the second PWM signal or only the third PWM signal is off.

3. A motor controller comprising:
an inverter configured to drive a motor based on a first PWM signal, a second PWM signal, and a third PWM signal;
a current detection unit configured to output a detection signal corresponding to a magnitude of a current flowing into a direct current line of the inverter;
a current detector configured to detect a phase current for each phase, by obtaining the detection signal;
a duty-cycle setting unit configured to set a duty cycle of each of the first PWM signal, the second PWM signal, and the third PWM signal, based on a corresponding detected value for a given phase; and
a PWM signal generator configured to generate each of the first PWM signal, the second PWM signal, and the third PWM signal, by comparing a setting value of a corresponding duty cycle against a level of a carrier, the level of the carrier increasing or decreasing periodically, wherein the current detector is configured to output, as a detected value, each of a first current magnitude and a second current magnitude, wherein the first current magnitude is obtained by subtracting a current flowing into the motor upon occurrence of a condition in which a voltage of which an average voltage magnitude is 0 V is applied to the motor, in conjunction with a condition in which only the first PWM signal is on, from a current flowing into the motor upon occurrence of a condition in which a voltage of which an average voltage magnitude is a magnitude other than 0 V is applied to the motor, in conjunction with a condition in which only the first PWM signal is on, and wherein the second current magnitude is obtained by subtracting a current flowing into the motor upon occurrence of a condition in which a voltage is not applied to the motor, in conjunction with a condition in which either only the second PWM signal or only the third PWM signal is off, from a current flowing into the motor upon occurrence of a condition in which a voltage is applied to the motor, in conjunction with a condition in which either'only the second PWM signal or only the third PWM signal is off.

4. A motor system comprising:
the motor controller according to claim 1; and
the motor.

5. A method for controlling a motor for execution by a motor controller to control the motor, the method comprising:
outputting a detection signal corresponding to a magnitude of a current flowing into a direct current line of an inverter that drives the motor based on a first PWM signal, a second PWM signal, and a third PWM signal;
detecting a phase current for each phase, by obtaining the detection signal;
setting a duty cycle of each of the first PWM signal, the second PWM signal, and the third PWM signal, based on a corresponding detected value for a given phase;
generating each of the first PWM signal, the second PWM signal, and the third PWM signal, by comparing a setting value of a corresponding duty cycle against a level of a carrier, the level of the carrier increasing or decreasing periodically; and
adjusting, upon occurrence of a condition in which a given setting value changes, a time sequence order of timings at which the first PWM signal, the second PWM signal, and the third PWM signal respectively change after a change in the given setting value, to be the same as a time sequence order of timings at which the first PWM signal, the second PWM signal, and the third PWM signal respectively change prior to the change in the given setting value, thereby ensuring a first energization time period and a second energization time period, within half of one period of the carrier, wherein the first energization time period has an energization width in which a current detector enables detecting of a given phase current for any one of phases, and wherein the second energization time period has an energization width in which the current detector enables detecting of a given phase current for any one of the phases.

6. A motor system comprising:
the motor controller according to claim 2; and
the motor.

7. A motor system comprising:
the motor controller according to claim 3; and
the motor.

* * * * *